Dec. 30, 1958     D. C. HIERATH ET AL     2,866,506
DIGITAL SYSTEMS FOR THE AUTOMATIC CONTROL OF MACHINERY
Filed Oct. 25, 1954     9 Sheets-Sheet 2

INVENTORS:
DORAN C. HIERATH
CLAUDE A. LANE
By Henry Hyman
ATTY.

Dec. 30, 1958 D. C. HIERATH ET AL 2,866,506
DIGITAL SYSTEMS FOR THE AUTOMATIC CONTROL OF MACHINERY
Filed Oct. 25, 1954 9 Sheets-Sheet 3

INVENTORS:
DORAN C. HIERATH
CLAUDE A. LANE

By Henry Heyman
ATT'Y.

Dec. 30, 1958   D. C. HIERATH ET AL   2,866,506
DIGITAL SYSTEMS FOR THE AUTOMATIC CONTROL OF MACHINERY
Filed Oct. 25, 1954   9 Sheets-Sheet 4

INVENTORS:
DORAN C. HIERATH
CLAUDE A. LANE
By Henry Heyman
ATTY.

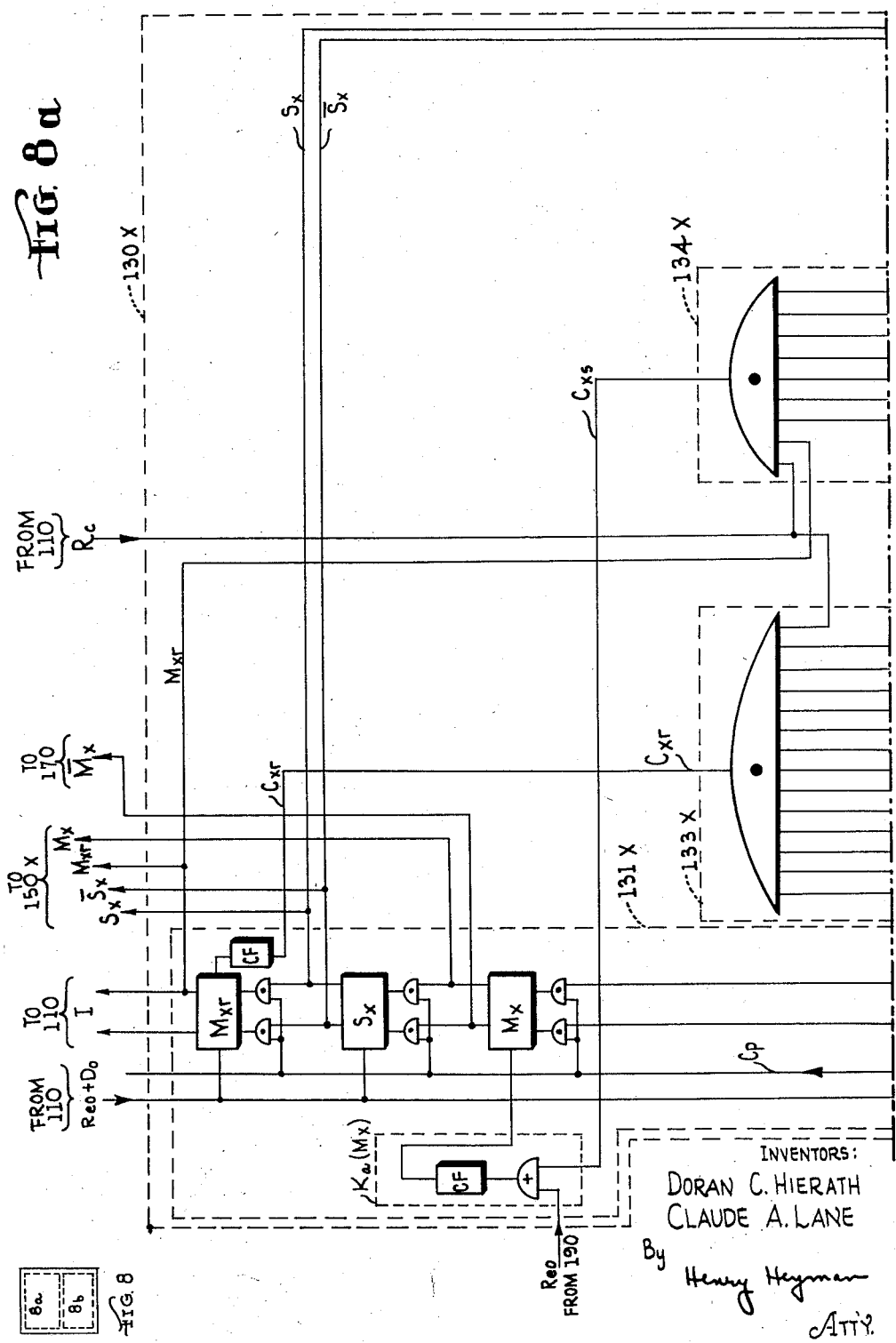
Dec. 30, 1958  D. C. HIERATH ET AL  2,866,506
DIGITAL SYSTEMS FOR THE AUTOMATIC CONTROL OF MACHINERY
Filed Oct. 25, 1954  9 Sheets-Sheet 6
INVENTORS:
DORAN C. HIERATH
CLAUDE A. LANE
By Henry Heyman
Atty.

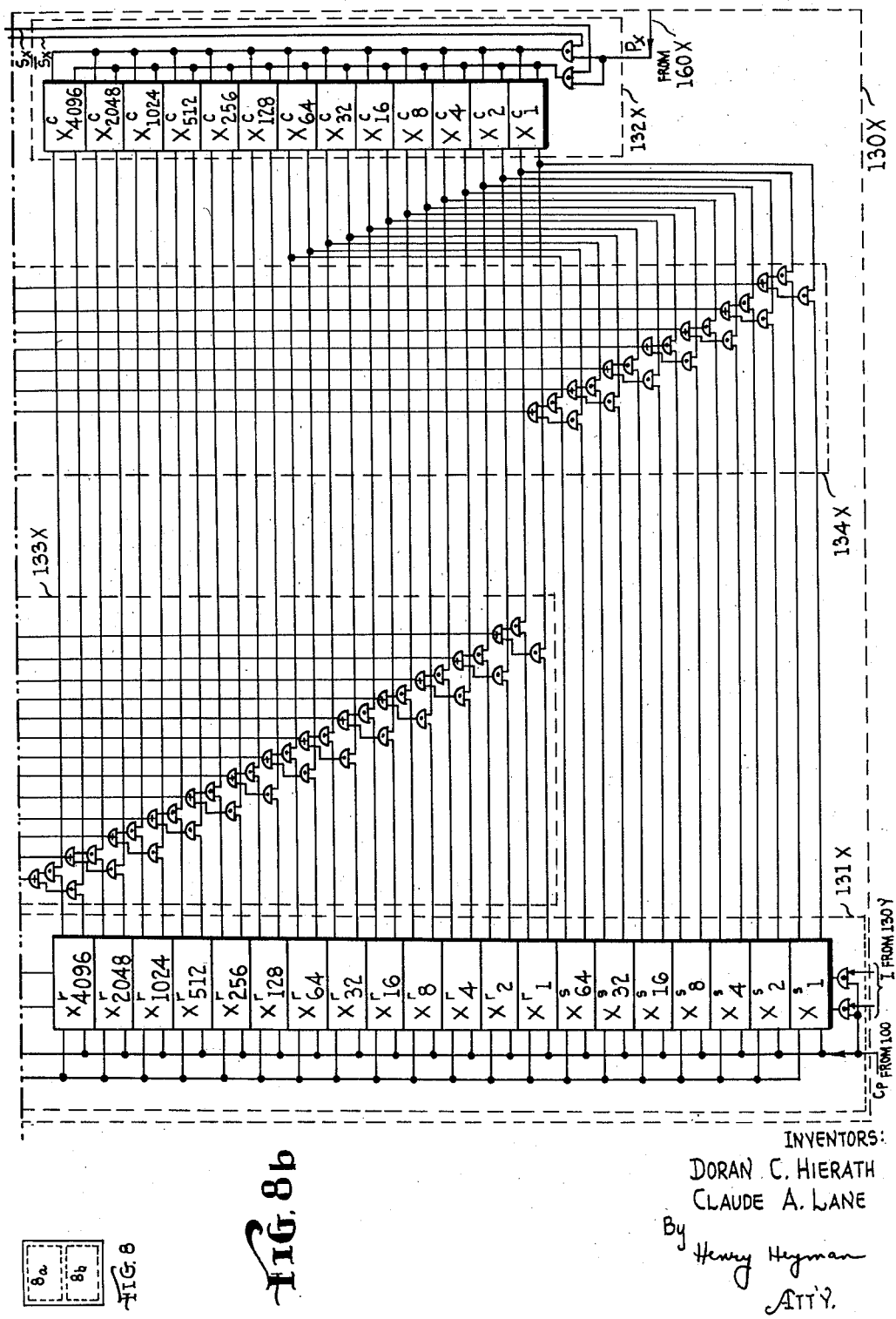

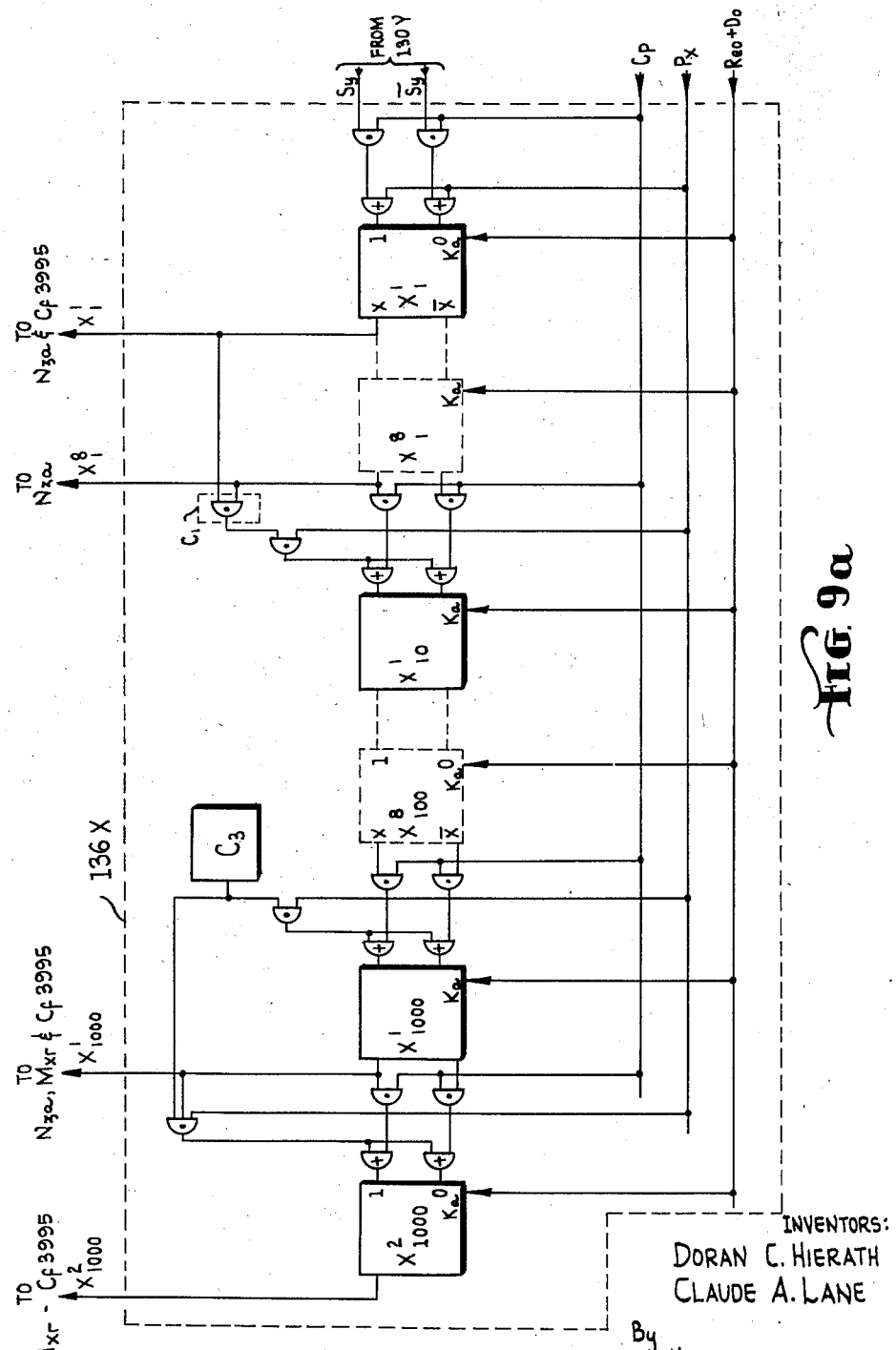

United States Patent Office 2,866,506
Patented Dec. 30, 1958

2,866,506

DIGITAL SYSTEMS FOR THE AUTOMATIC CONTROL OF MACHINERY

Doran C. Hierath, Santa Monica, and Claude A. Lane, Culver City, Calif., assignors to Hughes Aircraft Company, Culver City, Calif., a corporation of Delaware Application October 25, 1954, Serial No. 464,410

11 Claims. (Cl. 164—115)

This invention relates to digital systems for the automatic control of machinery and, more particularly, to an electronic control system including a digital computer wherein a sequence of operations to be performed is controlled by a corresponding series of digitally coded instructions which may be recorded as a stored program on a medium such as magnetic tape, drum, or disc, or on punched tape or cards.

The term "instruction" or "digitally coded instruction" as utilized herein is defined to mean a set of digital information which is properly coded for controlling a desired operation of a machine. The term "program" is defined to mean two or more instructions arranged to be utilized serially, one at a time. The term "stored program" is defined to mean a program which has been recorded on a medium such as magnetic tape, drum, or disc, or on punched tape or cards.

A system has been proposed in the prior art for the automatic control of machinery which may be referred to as the analogue play-back technique. According to this technique a series of machine operations are performed under the control of a skilled mechanic or operator, the performance of the machine being recorded on a suitable medium so that the record may be played back in order to control the machine to repeat automatically thereafter the same performance. Such a system is described in U. S. Patent 2,475,245 entitled "Method and Apparatus for the Automatic Control of Machinery," issued on July 5, 1949 to Eric W. Leaver et al. A similar system is described on pages 102 through 108 of an article entitled "Tape-controlled machines" by L. R. Peaslee, in "Electrical Manufacturing," November 1953. The analogue play-back technique has several distinct disadvantages. The accuracy of a system of this type is limited by the accuracy of the skilled mechanic as well as by the accuracy of the recorded analogue signals and of the devices controlled thereby. Finally, a skilled machine operator to prepare each program may not be readily available.

Prior art digital control systems have been described, for example, on pages 114 and 115 of an article entitled "Digital computer controlled machine tool" by E. D. Gittens, in "Electrical Manufacturing," August 1950, and on pages 133 through 137 of an article entitled "Numerically controlled milling machine" by A. K. Susskind et al., in the "Review of Input and Output Equipment Used in Computing Systems," American Institute of Electrical Engineers, March 1953. A system of this type is also described in U. S. Patent 2,537,427 entitled "Digital Servo" by E. Seid et al., issued January 9, 1951. Each of these systems utilizes a complicated digital-to-analogue servo for translating the digital control information into analogue control signals which control, for example, a machine tool. For example, where the speed of a moving part is being controlled, an analogue signal is utilized to control the movement of the part in order to decrease speed in response to the analogue signal and as a predetermined function thereof as the desired stopping point is approached. Thus, each of these systems is inherently very complex.

It is therefore apparent that, with any of the automatic control systems of the prior art, a direct digital control cannot be achieved.

Electronic digital control systems of the type disclosed by the present invention are particularly useful, for example, in controlling machine tool operations where one or more of the following features is desired: ease in programming different operations; versatility; reliability in performing repeatedly the same operation; high degree of accuracy; and speed.

In accordance with the present invention, ease in programming a series of operations arises from the fact that each independent operation may be specified by means of a separately digitally coded instruction. A program which consists of a series of separate operations of a machine tool may therefore be prepared by an operator who has no particular knowledge of the machine tool itself.

The electronic digital control system provided by the present invention is highly versatile. Analogue data representing observed physical values such as, for example, the instantaneous position of a machine tool, or a part thereof, is converted directly at the source into digital data such as electronic pulses available for the computer. Digital data is, in turn, utilized directly in carrying out the control function, for example, in positioning the machine tool. Thus, the entire control system is designed to interpret measured data, and to carry out desired instructions, in accordance with the digital language of the computer. A machine to be controlled may therefore be programmed for any series of operations of which it is capable and a particular program may with equal ease be repeated indefinitely or interchanged with other programs.

Reliability in performing repetitive operations is achieved because no human intervention is required while a particular program is being carried out, hence no human errors are introduced into the operation. A further significant feature is that a particular program may be permanently stored on a medium such as magnetic tape and may be kept for any desired time and may then be utilized again without requiring a skilled operator.

The accuracy of a digital control system may be limited both by the accuracy of the devices to be controlled thereby and also by the digital capacity of the system. According to the present invention, however, the control system has a digital capacity sufficient to provide greater accuracy than that inherent in the devices, hence the accuracy of the over-all system is limited only by that of the devices to be controlled.

In servo loop systems in general, there exists the problem of bringing the part to be moved to rest at a desired point; that is, the inertia of motion of the moving part must be overcome without introducing any oscillatory or "hunting" action, at the same time bringing the system to the proper point of rest in as short a time as possible. Whereas control systems of the prior art have controlled speed directly as an analogue function of the remaining distance to a desired stopping point, the digital control system of the present invention controls speed as a step function. Thus, for example, full speed may be utilized until a predetermined distance to the desired stopping point remains; a slow speed for the remaining distance; and at final destination, speed is reduced to zero and braking is employed.

One of the advantages of the system of the present invention lies in the use of an integrated program unit whereby the control circuits used for controlling machine operations may also be employed for preparing and storing the entire program. This feature lends considerable flexibility inasmuch as the program may be readily modified at any time to incorporate engineering changes, the only action which is necessary being to erase a particular portion from the magnetic tape or other storage medium and to re-record the new instructions as desired.

In accordance with the present invention, the position control function is exercised in the following manner. A motion detecting and indicating device is mounted upon the movable part for producing, in direct response to the motion of the part, digital signals such as voltage pulses. An electronic counter, responsive to these digital signals or pulses, is utilized to maintain a continuous record in numerical or digital form indicating the instantaneous position of the part. Circuit means are provided for receiving and storing a digital number or count which represents the desired position of the movable part and for performing a continuous comparison between this desired position and the instantaneous actual position. When the desired position is reached, an output signal is produced for controlling other sub-operations. The position control function may be accomplished either according to a relative address system or an absolute address system, as will be more specifically described, the mechanization of the circuits being largely determined by the speed control schedule of the present invention, wherein the velocity of the movable part is reduced in a stepwise manner as it nears the desired stopping point.

Accordingly, it is an object of the present invention to provide a system for the automatic control of machinery, wherein electronic digital control signals are utilized directly to control the desired function without the intervention of digital-to-analogue devices.

Another object of the invention is to provide a digital system for the automatic control of machinery or the like wherein ease of programming is attained by utilizing a digitally coded instruction to specify each independent operation to be performed.

A further object of the invention is to provide a digital control system wherein a series of operations may be performed in accordance with a previously recorded program.

Yet a further object of the invention is to provide a digital electronic system for automatically positioning a machine tool wherein the velocity of the tool is decreased in discrete steps as a desired position is approached.

Still another object of the invention is to provide a digital electronic system for automatically positioning a machine tool in accordance with a previously recorded program, the system including means for recording the program in the first instance or for re-recording selected portions of the program as may be required by engineering changes.

An additional object of the invention is to provide a versatile and accurate digital control system wherein errors incident to the positioning of a movable part in accordance with one operation have no cumulative effect upon the positioning of the part in accordance with succeeding operations.

Still a further object of the invention is to provide a digital electronic control system for automatically positioning a movable part in successive locations wherein each location is specified by means of a relative address indicating the distance from the previous location, an accumulation of errors being avoided by modifying each relative address in accordance with any error in the positioning of the part at the previous location.

Yet another object of the invention is to provide a digital electronic control system for automatically positioning a movable part at successive locations wherein each location is specified as an absolute quantity with respect to a zero or origin point, a continuous and instantaneous reference being maintained, at all times, with respect to the origin point and direct digital control signals being produced in response to a continuous comparison of the reference signal, representing instantaneous actual location of the part, with the absolute quantity representing the desired location.

The novel features which are believed to be characteristic of the invention, both as to its organization and method of operation, together with further objects and advantages thereof, will be better understood from the following description considered in connection with the accompanying drawings in which a specific embodiment of the invention is illustrated by way of example. It is to be expressly understood, however, that the drawings are for the purpose of illustration and description only, and are not intended as a definition of the limits of the invention.

Figure 1:
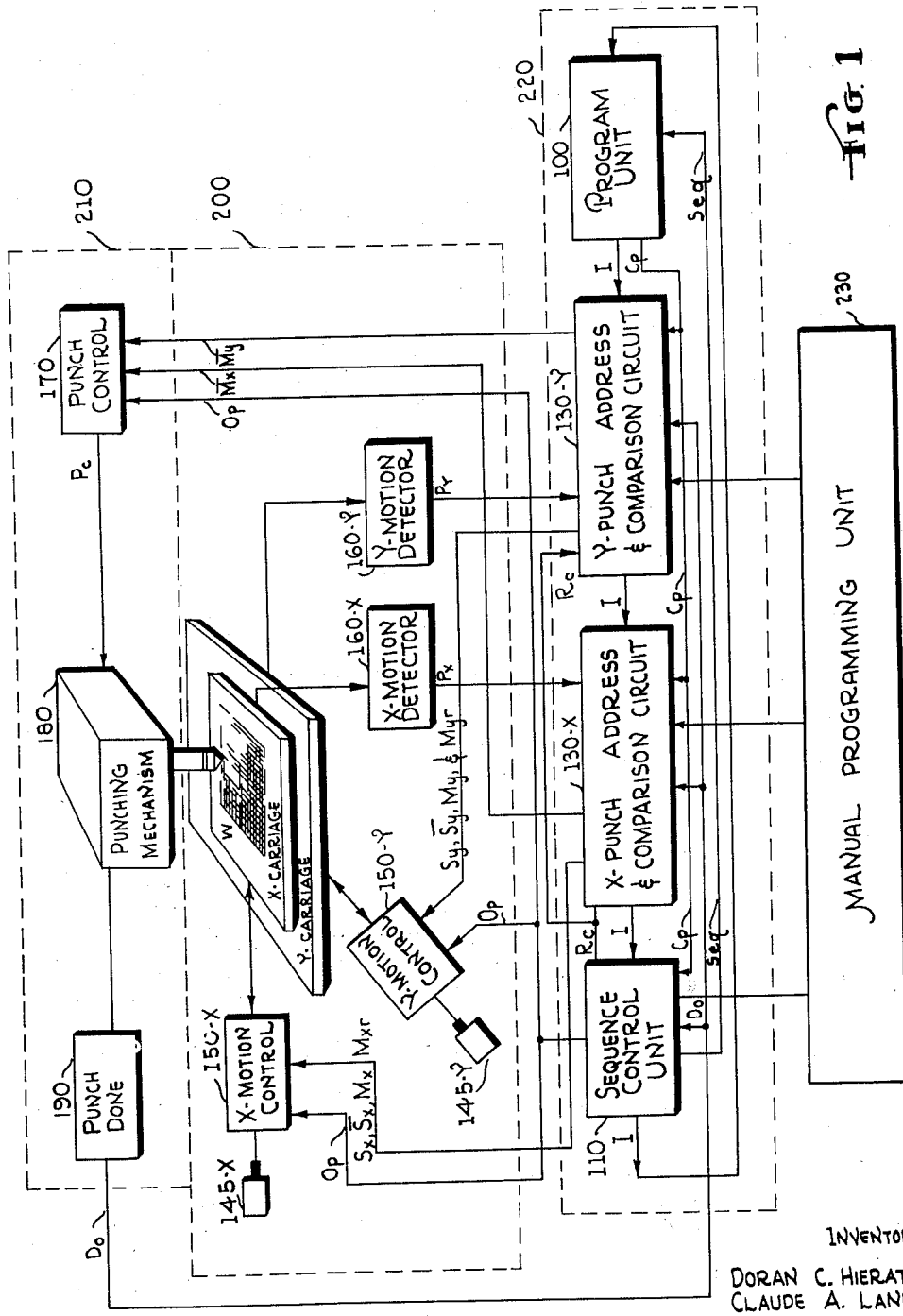
Fig. 1 is a block diagram of a punching machine and a digital control system for automatically controlling it in accordance with the present invention.
Figure 2:
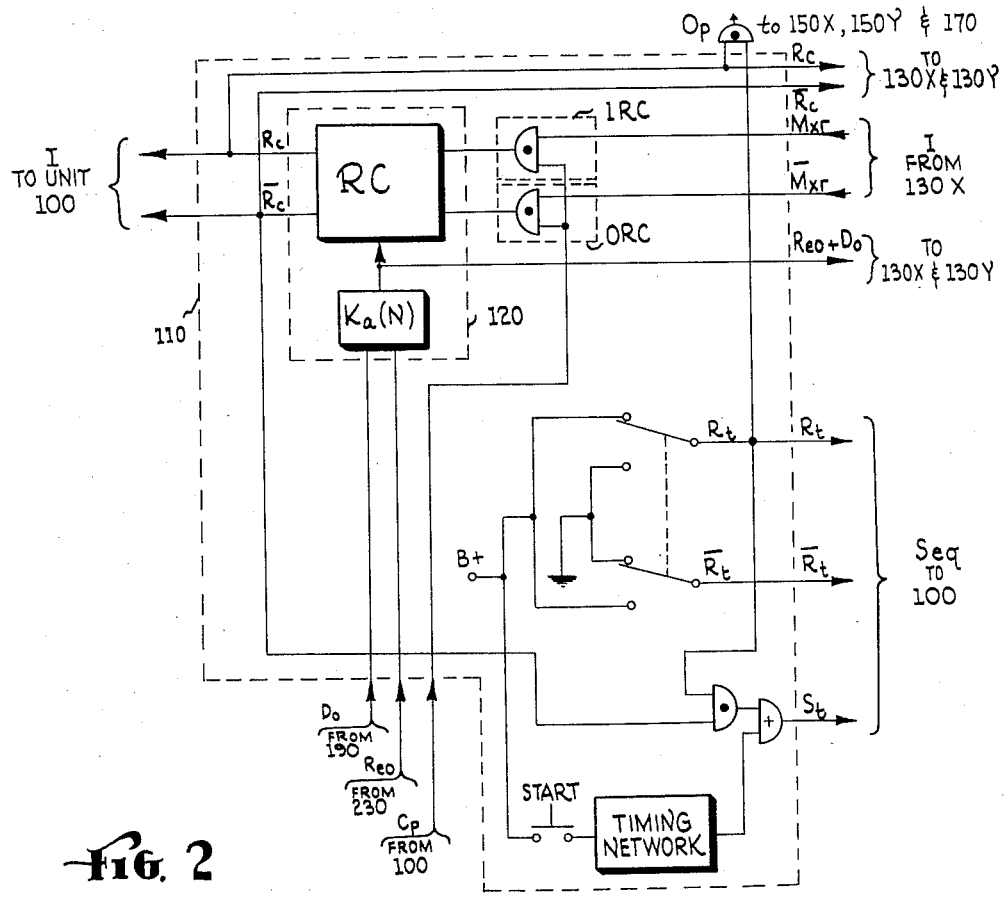
Fig. 2 is a schematic diagram of the sequence control unit utilized in the system of Fig. 1.
Figure 3A:
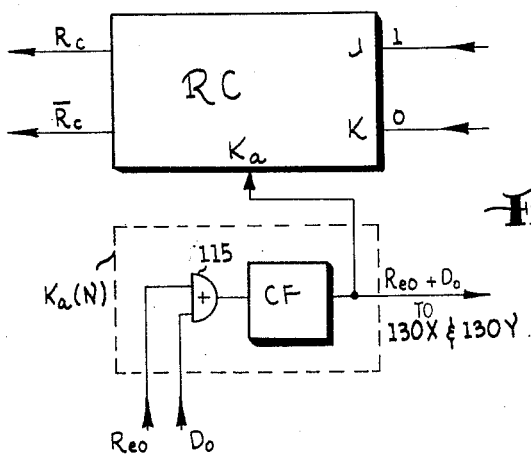
Figure 3C:
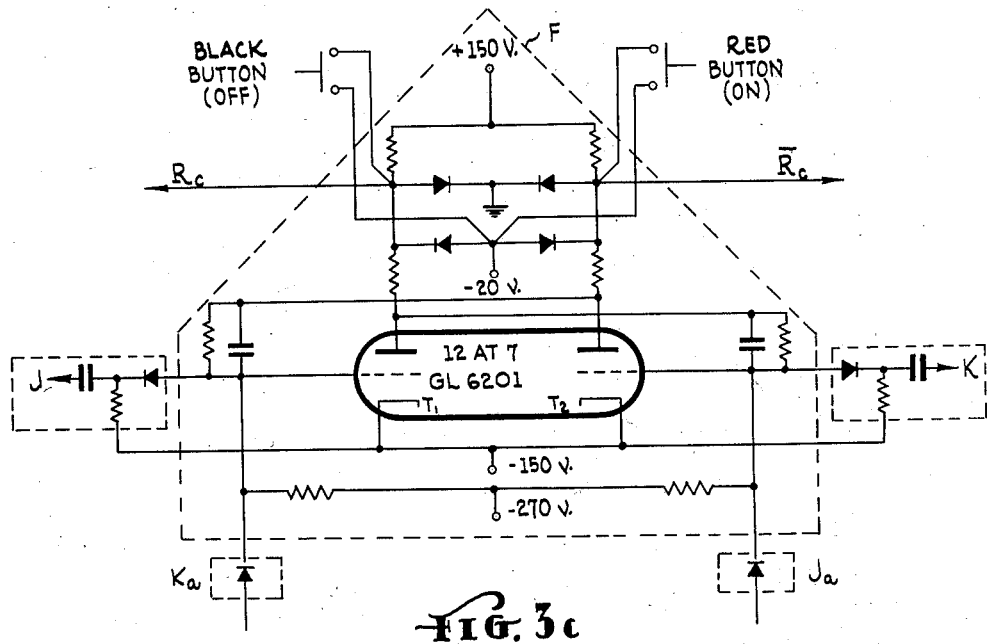
Figure 4:
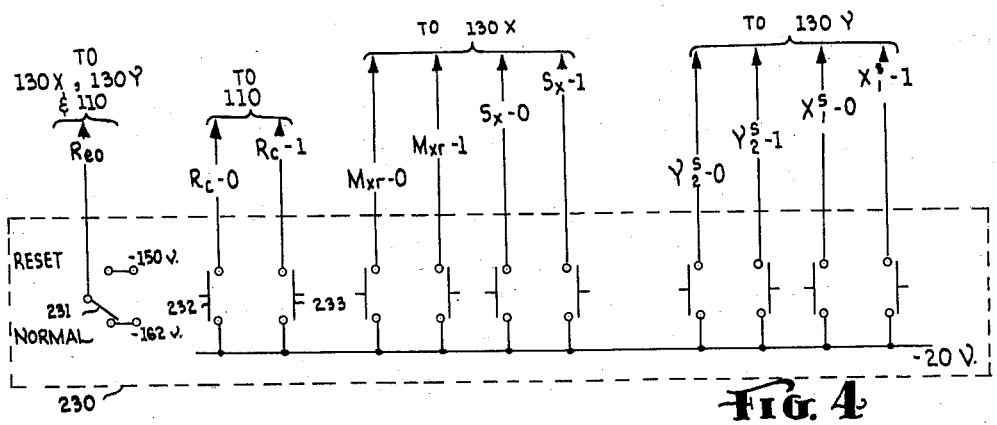
Figure 3B:
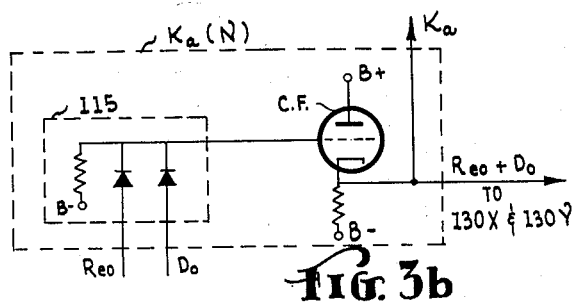
Figure 5:
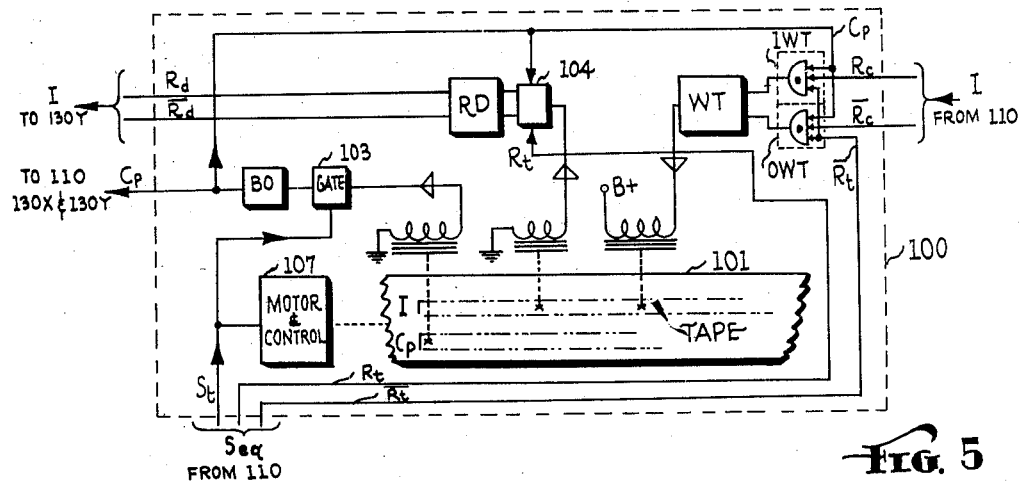
Figure 8C:
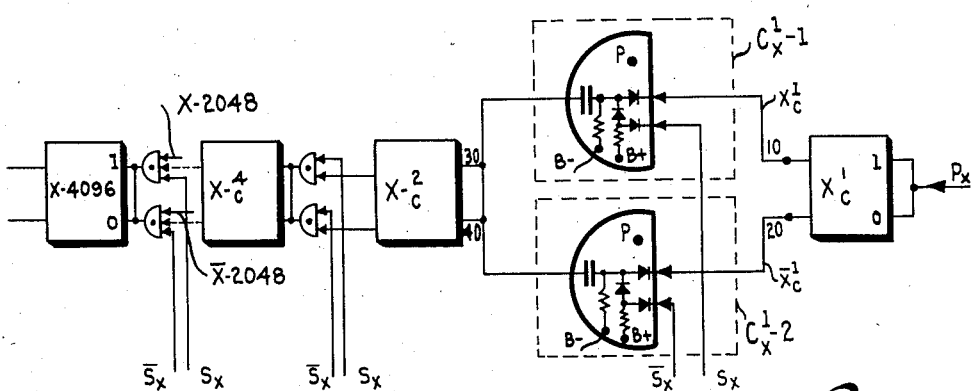
Figure 7:
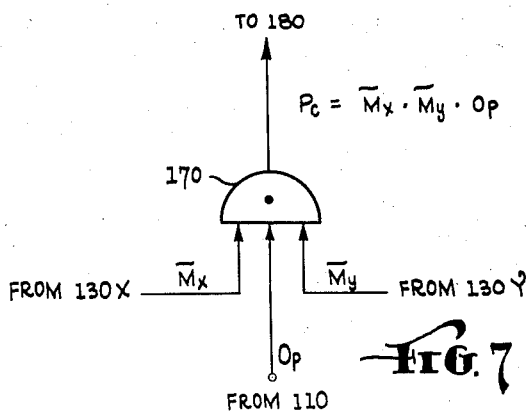
Figure 6:
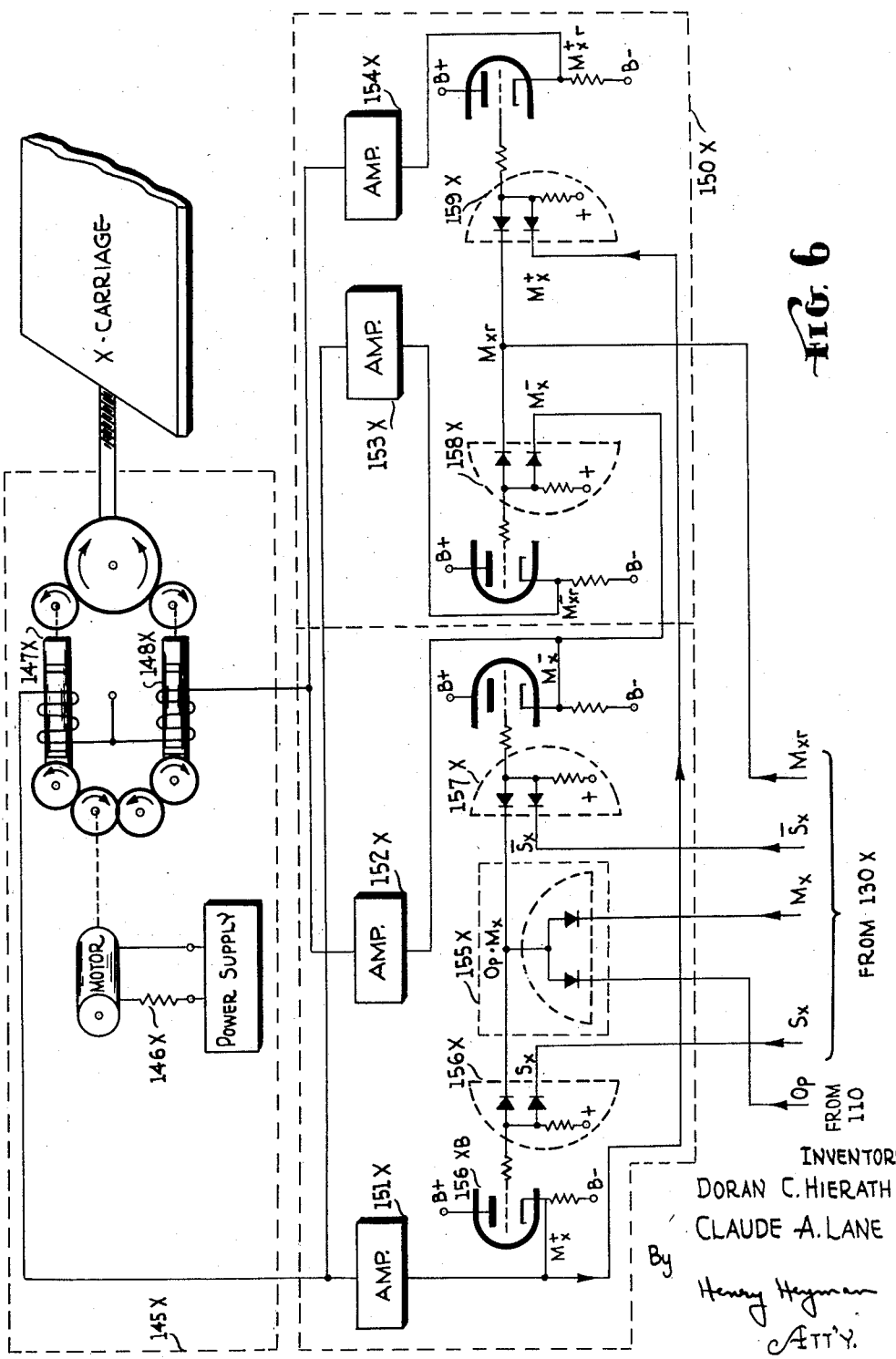
Figure 9:
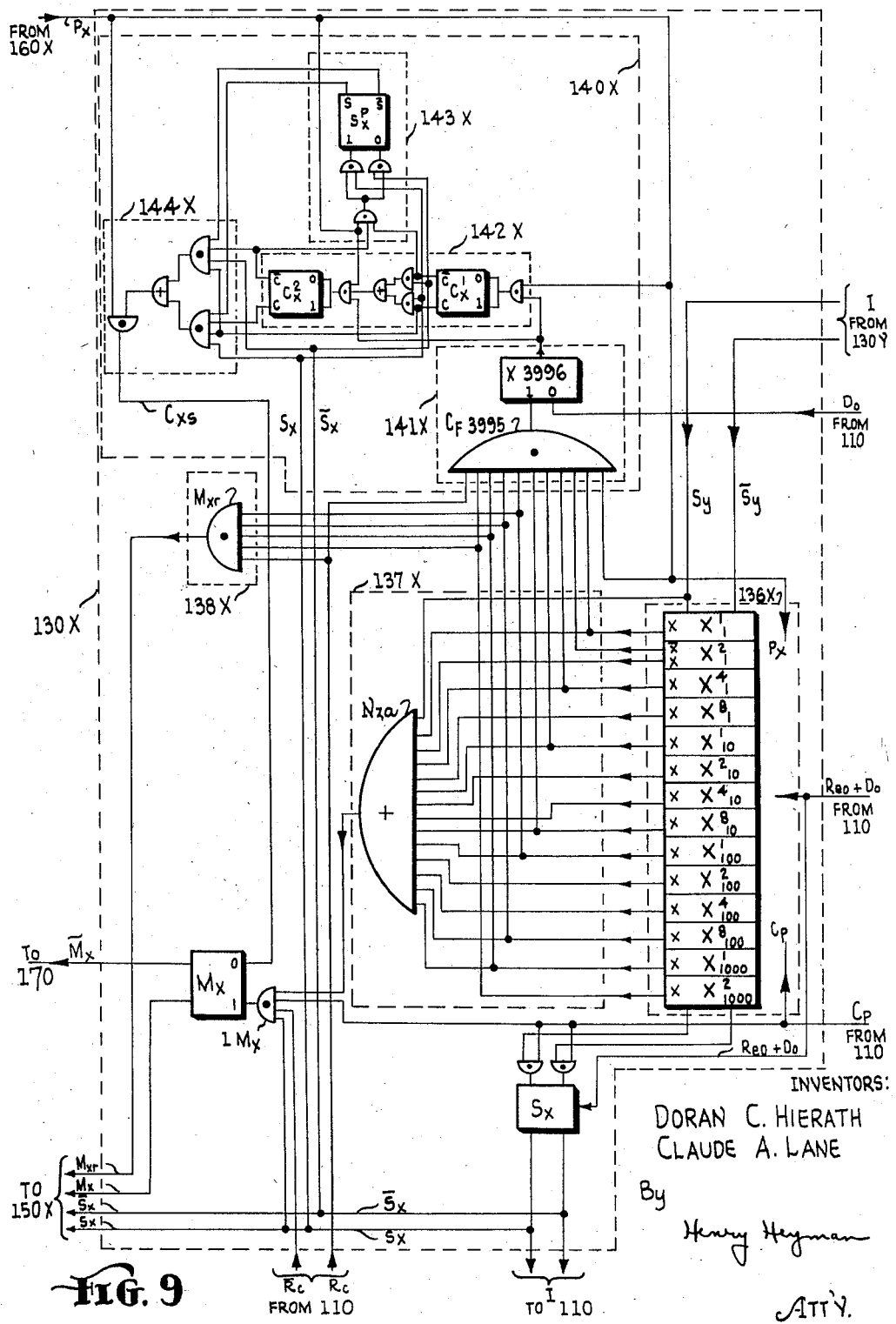

Figs. 3a, 3b, and 3c are circuit diagrams of a flip-flop circuit and a flip-flop reset circuit suitable for use in the circuit of Fig. 2 and elsewhere throughout the system of Fig. 1;

Fig. 4 is a schematic diagram of a manual programming unit suitable for use in the system of Fig. 1;

Fig. 5 is a block diagram of a program unit suitable for use in the system of Fig. 1;

Fig. 6 is a schematic diagram of a servo motor and of a logical circuit for controlling the same, suitable for use in the system of Fig. 1;

Fig. 7 is a schematic diagram of a punch control circuit suitable for use in the system of Fig. 1;

Figs. 8a and 8b considered together are a schematic diagram of a punch address and comparison circuit, in accordance with the absolute address system of control, suitable for use in the system of Fig. 1;

Fig. 8c is a schematic diagram, partly in block form, of a counter circuit suitable for use in the circuit of Figs. 8a–8b;

Fig. 9 is a schematic diagram of a punch address and comparison circuit according to the relative address method of control, suitable for use in Fig. 1; and Fig. 9a is a schematic diagram of a counter circuit suitable for use in the circuit of Fig. 9.

THE SYSTEM

Reference is now made to Fig. 1 wherein there is shown a system in accordance with the present invention for automatically controlling a punching machine by means of an electronic digital computer. The system of Fig. 1 comprises positioning control and detection apparatus 200; punch control and detection apparatus 210; computer programming and control circuits 220, all indicated generally by dotted rectangles; and a manual programming unit 230. A brief description of each of these major portions of the system will now be given.

Included within positioning control and detection apparatus 200 are separate X and Y carriages for supporting and positioning flat-work W to be punched. The carriages may be moved to provide any desired position of the work within a plane X—Y coordinate system by means of servomotors 145X and 145Y, which are controllable through X and Y motion control circuits 150X and 150Y, respectively. X and Y motion detectors 160X and 160Y cooperating with the respective carriages detect the motion thereof or the distance traveled from a starting point and produce corresponding electrical digital signals such as voltage pulses which are then supplied to the computer circuits.

The punch control and detection apparatus 210 includes a punch control circuit 170, a punching mechanism 180, and a punch-done device 190. The punching mechanism is located in a fixed position above the work. Punch control circuit 170 actuates the punching mechanism in response to signals generated by the computer when the carriages reach a desired position. Upon the upward or return stroke of the punching mechanism, device 190 is actuated for producing a digital electrical signal which is supplied to the computer to indicate that a punch has been completed.

Computer programming and control circuits 220, hereafter referred to as the computer, include a program unit 100, a Y punch address and comparison circuit 130Y, and X punch address and comparison circuit 130X, and a sequence control unit 110. Program unit 100 is adapted to contain a stored program consisting of a series of separate instructions of a fixed length. The program may, for example, be stored by a magnetic tape included in the program unit. Each of the punch address and comparison circuits 130X and 130Y includes a static storage register (not shown) for receiving portions of the instruction respectively representing X and Y addresses of a desired punch location. The punch address and comparison circuits are also adapted to exercise control over the X and Y motion control circuits 150X and 150Y when an instruction is being carried out. Sequence control unit 110 includes means for controlling four major operating phases, as will now be explained.

Manual programming unit 230 is utilized in one of the major operating phases for the advance preparation of a program. This unit includes manual controls for setting the static storage portions of the X and Y punch address and comparison circuits to correspond to a desired instruction. In this manner, an entire program may be prepared, one instruction at a time, directly from drawings by an operator who need not be familiar with the workings of the punching machine itself. The manual controls may also be conveniently utilized for re-recording a portion of a program to conform to engineering changes, for example.

Within sequence control unit 110 two binary or "on-off" control signals $Rt$ and $St$ (not shown) having the value 0 or 1 are utilized to represent the four major operating phases. These operating phases and the signals which represent them may be conveniently tabulated as follows:

*Table I*

| Phase | Rt | St | |
|---|---|---|---|
| I | 0 | 0 | Program Preparation; Manual set-up of an instruction. |
| II | 0 | 1 | Program Preparation; recording an instruction into program unit 100. |
| III | 1 | 1 | Program Performance; reading an instruction from program unit 100. |
| IV | 1 | 0 | Program performance; performing an instruction. |

As will be apparent from Table I the manual programming unit is utilized only during phase I for setting up an instruction, whereas positioning control and detection apparatus 200 and punching control and detection apparatus 210 are utilized only during phase IV for the performance of an instruction. Phases II and III, therefore, take place entirely within the computer.

Sequence control unit 110 includes manual controls for setting the signals $Rt$ and $St$ to 0 or to 1 whereby an operator may conveniently switch the operation of the system from one phase to another. During program performance, however, it is desirable for the operation to be carried out continuously, hence the sequence control unit also includes means for automatically switching back and forth between phases III and IV.

Before considering the structure and function of specific components of the system of Fig. 1 it will be advantageous to describe the operation of the system as a whole. This description of operation may be conveniently organized upon the basis of the phases established in Table I.

During phase I the manual programming unit is utilized for setting up a desired instruction. The static storage register of each of the punch address and comparison circuits comprises a bank of flip-flops or bistable circuits, each capable of storing a binary digit, according to the state to which it has been set. Thus, a series of 1's and 0's representing the Y punch address is set into circuit 130Y and a similar series representing the X punch address is set into circuit 130X. A single flip-flop RC (not shown) in sequence control unit 110 is set to a 1-representing state corresponding to a marker bit, as will be explained. When the instruction is complete, the signal $St$ of the sequence control unit is manually set to 1 to initiate phase II.

During phase II the instruction is transferred from the static storage registers of the punch address and comparison circuits and from flip-flop RC serially into program unit 100. In Fig. 1 the arrows designated I indicate the flow of information from Y punch address circuit 130Y to X punch address circuit 130X, from X punch address circuit 130X to sequence control unit 110, and from sequence control unit 110 to program unit 100. Thus, the marker bit previously stored in flip-flop RC becomes the first bit of the instruction to be recorded in the program unit.

Separate instructions may thus be set up and recorded on the tape as desired until a complete program has been prepared. This stored program may then be utilized for punching a piece of flat work in one continuous operation, or for punching a quantity of pieces in a repetitive operation as may be desired.

During phase III an instruction is serially transferred from the program unit (as indicated by arrows I) into Y punch address circuit 130Y and hence into X punch address circuit 130X and into flip-flop RC. The arrival of the marker bit in flip-flop RC denotes the completion of the instruction transfer, and changes signal $St$ from 1 to 0, thus initiating phase IV.

Throughout all the operating phases program unit 100 is controlled by means of signals $Rt$ and $St$ from the sequence control unit, these signals being jointly designated in Fig. 1 by an arrow Seq. Another arrow, Rc, originating from the sequence control unit indicates the application of the output signal of flip-flop RC to circuits 130X and 130Y for controlling their operation during phases III and IV in a manner which will be more apparent from the detailed description of those circuits.

During phase IV operation the X and Y carriages are moved to their desired locations under the supervisory control of address and comparison circuits 130X and 130Y with the assistance of digital motion signals $Px$ and $Py$ supplied by motion detectors 160X and 160Y, respectively. When an instruction is being transferred into the control circuits during phase III operation the carriages remain at rest in the punch position corresponding to the previous instruction; in response to the new instruction the carriages are then moved directly to the desired new location. In performing an instruction each carriage is moved initially at full speed; speed is decreased to approximately half at a predetermined distance of the carriage from its new position; and the carriage is stopped when it reaches its destination. When both carriages have stopped, punch control circuit 170 supplies a signal $Pc$ for actuating the punching mechanism, and after completion of the punch a signal $Do$ is supplied by device 190 for resetting the control circuits to receive the next instruction and for switching signal $St$ to 1 in order to again initiate phase III.

The system of Fig. 1 provides a high speed operation of reasonable accuracy, in order to achieve production economy, rather than the greatest possible accuracy with correspondingly slower operating speed and more expensive equipment. Thus, where, for example, holes are to be punched in a work piece 4" x 4" and the assumed maximum accuracy of the system is 0.001 inch or 1 mil, an error of greater than 1 mil in locating each punch position may nevertheless be permitted to occur. For example, the inertia of the relatively heavy carriage mechanisms may produce an over-travel of as much as 3 mils. According to the system of Fig. 1, any such error as detected by motion detectors 160X and 160Y, is duly registered in the punch address and comparison circuits, and is taken into account within the punch address and comparison circuits in positioning the carriages at the next punch location.

Motion detectors 160X and 160Y which are not specifically shown and described herein, may be of the type described and claimed in copending patent application Serial No. 402,263 for "Gated Light Pulse Generating Mechanism for Measuring Motion," by Doran C. Hierath, filed January 5, 1954 and now abandoned. The detector therein described utilizes two optical gratings, each having lines scribed thereon at a predetermined spacing, relative motion between the two gratings being detected photoelectrically. The complete detector unit includes electrical output means for producing a discrete pulse signal whenever a predetermined relative displacement between the two gratings has taken place. One grating may, of course, be permanently fastened to the particular carriage to move therewith, while the other grating is fastened to the fixed frame of the punching machine. In accordance with the system of Fig. 1 the predetermined displacement is 1 mil. Thus, each motion detector produces one pulse on the completion of each 1 mil of travel by the corresponding carriage. These digital signals or pulses designated as $Px$ and $Py$, are transmitted from the motion detectors to the respective punch address and comparison circuits.

During phases II and III the shifting of instructions through circuits 130Y, 130X and flip-flop RC of circuit 110 requires timing or synchronization. This is provided by clock pulses which are generated within program unit 100 and which are designated in Fig. 1 by means of arrows $Cp$. During carriage motion the digital motion signals $Px$ and $Py$ are utilized for synchronizing counting operations and other control functions of circuits 130X and 130Y, respectively. Thus, during phases II and III the two punch address and comparison circuits are synchronized with each other and with the program unit; during phase IV, however, each is separately synchronized with the motion of the carriage which it controls.

It is convenient to employ bistable flip-flop circuits throughout the system of Fig. 1 for producing and storing various binary or "on-off" control signals. Accordingly, voltage-state signals of the type produced by flip-flop circuits, as distinguished from pulse signals, will be assumed throughout the discussion except where otherwise noted. A binary variable such as A may be represented by means of a pair of complementary electrical signals denoted as A and $\bar{A}$, respectively. Signal A may then be regarded as a primary electrical signal which directly represents the binary variable A, whereas signal $\bar{A}$ is a complementary signal which has a 0-representing value when A is 1, and a 1-representing value when A is 0. This method of representation, which is now well known in the art, provides advantages in the mechanization of logical circuits as will become more apparent from the detailed description.

Other control signals indicated in Fig. 1 are utilized during phase IV and are assigned conventional meanings corresponding to 1-representing values as follows:

$Op$—Phase IV operation
$Sx$—Positive motion of X carriage
$\overline{Sx}$—Negative motion of X carriage
$Mx$—Motion in X direction is desired
$\overline{Mx}$—Motion in X direction is not desired
$Mxr$—Speed of X carriage is to be reduced
$Sy$—Positive motion of Y carriage
$\overline{Sy}$—Negative motion of X carriage
$My$—Motion in Y direction is desired
$\overline{My}$—Motion in Y direction is not desired
$Myr$—Speed of Y carriage is to be reduced Most of the circuits which are utilized to provide the direct-digital control signals, in accordance with the basic principles of the present invention, are mechanized according to logical equations. Although in the discussion which follows there will be described specific embodiments of circuits which may be utilized in the system of Fig. 1, it must nevertheless be understood that each such logical circuit has, in general, a number of equivalents which while differing in detail accomplish the same result. Accordingly, emphasis will be placed upon the functional concept associated with each such circuit, and the logical derivation of the various control signals and of the circuits for mechanizing them will be explained.

The principles of logical or Boolean algebra will be frequently employed in this discussion and will be utilized for mechanizing the circuits directly by means of "and" and "or" gates which correspond directly to the logical equations. It is not considered necessary to describe the specific mechanization of the "and" and "or" circuits since these circuits are well-known in the art. Typical circuits are shown, for example, on pages 37 to 45 of "High-Speed Computing Devices" by Engineering Research Associates, published in 1950 by McGraw-Hill Book Company, Inc., New York and London, and on pages 511 through 514 of an article entitled "Diode coincidence and mixing circuits in digital computers" by Tung Chang Chen, in the Proceedings of the Institute of Radio Engineers, volume 38, May 1950.

SEQUENCE CONTROL UNIT

Reference is now made to Fig. 2 wherein there is shown a schematic diagram of the sequence control unit 110 in accordance with the present invention. The sequence control unit produces binary signals $Rt$, $St$ and $Op$, as previously explained, and also includes the flip-flop RC which is coupled into the information channel I shown in Fig. 1.

In accordance with the utilization of a marker bit at the beginning of each instruction as previously explained, and in order to provide automatic switching back and forth between phases III and IV when a program is being performed, the operating phases are represented by signals $Rt$, $St$, and $Rc$ as follows:

*Table II*

| Phase | $Rt$ | $St$ | $Rc$ |
|---|---|---|---|
| I | 0 | 0 | |
| II | 0 | 1 | |
| III | 1 | 1 | 0 |
| IV | 1 | 0 | 1 |

Thus the arrival of a marker bit in flip-flop RC changes its output signal $Rc$ indicated in Fig. 2 from 0 to 1 initiating switching from phase III to phase IV. Similarly the resetting of flip-flop RC to 0 by signal $Do$ from device 190 at the end of phase IV initiates switching back to phase III.

The corresponding mechanizations are illustrated in Fig. 2. Signal $Rt$ is produced by a manually controlled double-pole double-throw switch whereby a pair of complementary electrical signals $Rt$ and $\overline{Rt}$ may be provided by selectively connecting the two output terminals of the switch either to ground and to a voltage source B+, or vice versa.

In order to initiate phase II, for the recording of an instruction, signal $St$ may be set to 1 by manually depressing a start button as illustrated. The start button actuates a timing network which produces a high-level output voltage signal for a predetermined period of time upon being energized by a voltage source B+ through the start button. The purpose of the timing network is to operate the magnetic tape only for a sufficiently long time to record an instruction and to permit a short space on the tape between instructions.

Signal S*t* must also be set to 1, as indicated in Table II, when R*t* is 1 and R*c* is 0. The complete expression for the 1-representing value of signal S*t* is therefore $$St = Rt.\overline{Rc} + Start$$

where the dot (.) represents the logical "and" function and the plus (+) represents the logical "or" function.

Accordingly in Fig. 2 there is included an "and" circuit 111 having two separate input terminals to which signals R*t* and $\overline{Rc}$ are applied, and an output terminal; and an "or" circuit 112 having two separate input terminals, one of which is connected to the manually operable timing network, and the other of which is connected to the output terminal of the "and" circuit 111. The "or" circuit 112 has an output terminal upon which signal S*t* appears. Each "and" circuit is represented by means of a semicircle containing a dot (.) and each "or" circuit is represented by means of a semicircle containing a plus (+), such circuits being, as previously explained, so well known in the art as not to require illustration in greater detail.

Signal O*p* representative of phase IV may, from Table II, be provided as follows:

$$(Op) \quad Op = Rt.Rc$$

where the dot (.) represents again the logical "and." Accordingly in the circuit of Fig. 2 there is included an "and" circuit 113 having two separate input terminals to which signals R*t* and R*c* are applied, and a single output terminal providing the function O*p*, which has a 1-representing value whenever both signals R*t* "and" R*c* have 1-representing values.

Signals R*t*, $\overline{Rt}$, and S*t*, designated jointly as Seq, are supplied to program unit 100 for sequence control purposes.

The output signals R*c* and $\overline{Rc}$ from flip-flop RC are supplied during phase II to program unit 100 as information signals; and are also supplied to address and comparison circuits 130X and 130Y for controlling shifting operations therein in a manner which will be explained in connection with Figs. 8 and 9.

During the shifting of instructions (phases II and III) flip-flop RC receives information signals from a flip-flop in X punch address circuit 130X (either flip-flop MXR of Fig. 8 for absolute address system, or flip-flop $X^2{}_{1000}$ of Fig. 9 for relative address system). These input functions for flip-flop RC may then be specified as:

$$(1RC) \quad 1RC = Mxr.Cp$$
$$(0RC) \quad 0RC = \overline{Mxr}.Cp$$

where the dot represents the logical "and" function and the symbol C*p* represents the clock pulses as previously explained.

Flip-flop RC which in Fig. 2 is designated generally by means of dotted lines 120, includes an additional reset circuit K*a*(N) to which signal D*o* and a signal R*eo* (from the manual programming unit 230) are applied. The function and structure of this reset circuit will now be explained.

FLIP-FLOP AND RESET CIRCUITS

Reference is now made to Figs. 3*a*, 3*b*, and 3*c*, showing in detail a suitable mechanization of flip-flop RC and of a special reset circuit for controlling the flip-flop. Fig. 3*a* illustrates the flip-flop and the reset circuit in block form; Fig. 3*b* shows a schematic circuit diagram of the reset circuit; and Fig. 3*c* is a schematic circuit diagram of the flip-flop circuit.

In Fig. 3*a* flip-flop RC is indicated in block form as having J and K inputs as well as two output circuits providing primary and complementary output signals R*c* and $\overline{Rc}$, respectively. In addition, flip-flop RC is shown as having a special 0-setting input circuit K*a*. A reset circuit K*a*(N) shown in dotted lines generates a reset signal for controlling the K*a* input of flip-flop RC as well as the K*a* input circuits of other flip-flops in circuits 130X and 130Y, as will be explained. Circuit K*a*(N) includes an "or" circuit 115 for controlling a cathode follower CF in response to signals R*eo* and D*o* in a manner which will be described.

Reset circuit K*a*(N) is illustrated in detail in Fig. 3*b*, wherein a battery E*c* represents a source of biasing voltage normally applied to the grid of cathode follower CF. "Or" gate 115 is selectively responsive to either signal R*eo* "or" signal D*o* for making the grid potential of the cathode follower more positive, thus selectively supplying a positive bias over and above the normal bias supplied to the cathode follower. The output signal from the cathode of the cathode follower is applied to the K*a* input of flip-flop RC, and is also available to circuits 130X and 130Y as indicated by the arrow marked R*eo*+D*o*.

Fig. 3*c* shows the flip-flop circuit in detail, including major portions thereof respectively indicated by dotted lines F, J, K, J*a*, and K*a*. Circuit F is a bistable trigger circuit of the Eccles-Jordan type including a pair of cross-coupled triodes, and further including a clamping network whereby one of the output signals R*c* and $\overline{Rc}$ is maintained at one voltage level and the other output signal at another voltage level, the two voltage levels being specifically indicated as zero volts and −20 volts. Input circuits J and K may include, in addition to the conventional circuit shown, a gating circuit of the type described in copending patent application Serial No. 327,133 for "Diode, Pulse-Gating Circuits" by Richard D. Forrest, filed December 20, 1952 and now Patent No. 2,762,936. The gating circuit described in the copending application is particularly suitable for logically combining voltage-level signals with pulse signals, and more specifically, for selectively passing a negative clock-pulse when an associated voltage-level signal is at the higher one of its two possible levels.

Input circuits J*a* and K*a* each consists of a single diode which may, as described in copending application Serial No. 443,741 for "Electronic Flip-Flop Circuits," by Cameron B. Forrest, filed July 16, 1954, be biased at a fixed potential which is below cutoff by the expected noise level, for improving the trigger sensitivity of the flip-flop circuit. However, by taking the bias from reset circuit K*a*(N) the single diode performs this type of clamping function when the normal bias is applied, and controls the conduction state of the flip-flop when a more positive bias is applied. More specifically, the application of a more positive bias to the K*a* input resets the flip-flop to an 0-representing state in which the primary output signal R*c* is at the 0-representing or lower voltage level of −20 volts and the complementary output signal $\overline{Rc}$ is at the 1-representing or higher voltage level of zero volts; and the application of a more positive bias to the J*a* input resets the flip-flop to a 1-representing state.

Reset circuit K*a*(N) and the J*a* and K*a* input circuits need not be described in greater detail herein inasmuch as they are the subject of copending patent application Serial No. 484,667, "Voltage State Reset Gate," by Claude A. Lane, filed January 28, 1955. It should be pointed out, however, that the use of the special reset circuit and of the J*a* and K*a* input circuits for automatically resetting various flip-flops in accordance with the present invention may be obviated by employing more complex logical gating circuits for controlling the conventional 1 and 0 input circuits of the various flip-flops.

The flip-flop circuit of Fig. 3*c* also includes a pair of buttons for manually resetting the flip-flop to the 1 or 0 state as desired. A "black" button may be manually depressed for directly connecting the primary output signal Rc to the lower voltage source of −20 volts, thus setting the flip-flop to the 0 or "off" condition; whereas a "red" button is similarly operable for setting the flip-flop to the 1 or "on" condition. These buttons are physically located in the manual programming unit.

MANUAL PROGRAMMING UNIT

Reference is now made to Fig. 4 showing the structure of manual programming unit 230 in detail. A single switch 231 is provided for supplying the reset signal Reo which, through the medium of special reset circuit Ka(N) as previously explained, is utilized for simultaneously setting various flip-flops of the system of Fig. 1 to their 0 state.

In addition, a plurality of pairs of button switches are provided for separately setting the various flip-flops to 0 or 1 as desired. For example, button 232 is the "black" button for setting flip-flop RC to 0, and is operable to connect to a source of −20 volts an output lead designated Rc—0, which is connected to the primary output circuit of flip-flop RC as previously described. Similarly, a "red" button 233 and output lead Rc—1 are included for setting flip-flop RC to 1 in the manner previously explained.

The various output leads designated as going to circuits 130X and 130Y are labeled in accordance with flip-flop designations employed in the absolute address system of Fig. 8. It will of course be understood that for utilization with the relative address system of Fig. 9 the structure and function of the programming unit are substantially the same except that the signals provided by the various output leads are applied to different flip-flops.

PROGRAM UNIT

Reference is now made to Fig. 5 wherein there is shown in block diagram form a magnetic tape storage unit which is suitable for use as the program unit 100 of Fig. 1. Storage or program unit 100 includes a two-channel tape 101, a motor 102 for operating the tape, and various reading and writing circuits as will be explained.

The tape includes an information channel I upon which instructions may be recorded through a writing flip-flop WT and a writing head during phase II operations, or from which instructions may be read by means of a reading head and a reading flip-flop RD during phase III operations. The second tape channel Cp has timing or clock pulses Cp permanently recorded thereon, which are continuously read by a pick-up head during phases II and III and are made available through a blocking oscillator BO for timing or synchronizing purposes. The blocking oscillator is gated on by a gate 103 in response to signal St.

The operation of storage unit 100 is controlled by signals St, Rt, and $\overline{Rt}$ received from sequence control unit 110. Thus, signal St is applied to a motor control circuit for operating the tape whenever St is 1, namely, during phases II and III. Signal St therefore has the logical meaning of "start tape." In a similar manner signal Rt, which has the logical significance "read from tape," is likewise utilized to control flip-flop WT to perform writing operations during phase II. Information represented by signals Rc and $\overline{Rc}$ is gated into the flip-flop under control of the function $\overline{Rt}.Cp$, which represents the clock pulses available only when St is 1 (see Table I or Table II). Thus in Fig. 5 flip-flop WT is controlled according to the functions $$(1WT) \quad 1WT = Rc.\overline{Rt}.Cp$$
$$(0WT) \quad 0WT = \overline{Rc}.\overline{Rt}.Cp$$

It is apparent that a program unit of the type shown in Fig. 5 is small, compact, and economical, and therefore greatly enhances the utility of the system of Fig. 1.

The tape may be started or stopped at the convenience of the operator since signal St may be manually controlled. An engineering change, for example, may therefore be incorporated into a program merely by re-recording one or more of the instructions included therein.

During phase III output information is generated by flip-flop RD under the control of a gate 104, according to the function Rt.Cp, the clock pulses again having the same logical significance as signal St. Output signals Rd and $\overline{Rd}$ are supplied to circuit 130Y.

From the above description of the program unit the advantage of the marker bit and of the use of flip-flop RC becomes more apparent. Timing within phase III is provided by clock pulses Cp, and timing within phase IV by digital motion signals Px and Py, whereas the marker bit and flip-flop RC perform the transitional timing functions in changing from one phase of operation to the other.

The magnetic tape storage unit of Fig. 5 has been shown and described generally, rather than specifically, since such systems are very well known in the art and the particular details thereof form no significant part of the present invention. Program unit 100 may, however, be a data storage system of the general type shown and described in U. S. Patent 2,540,654 entitled "Data Storage System," issued on February 6, 1951, to A. A. Cohen et al. The above patent describes a magnetic drum memory or storage system wherein one channel is employed as a timing track upon which timing pulses are permanently recorded, and another channel is employed as the program or information channel. With a system of this general type, the timing pulses may be utilized for synchronizing related circuits during an information read-in or recording phase of operation, and also during an information play-back or read-out phase of operation.

MOTOR AND CIRCUIT FOR CONTROLLING CARRIAGE MOTION

Referring now to Fig. 6 there is shown a servo motor 145X and a motion control circuit 150X for controlling the operation thereof, both being identified by dotted rectangles.

Motion control circuit 150X is operative during phase IV (indicated by signal Op) to provide X carriage motion (controlled by signal Mx) either in the positive or negative direction (controlled by signals Sx and $\overline{Sx}$, respectively) either at full speed or a reduced speed (controlled by signal Mxr.). These signals are accordingly supplied as the input signals for circuit 150X.

Although servomotor 145X may be of any desired type, the type illustrated in Fig. 6 is a clutch-controlled motor having both a positive clutch 147X and a negative clutch 148X which can be separately actuated to provide full speed in either direction, or which can be actuated in combination to provide a reduced speed in either direction by having one clutch on and the other clutch half on. Thus, full speed in the positive direction may be provided by supplying a full clutching current to clutch 147X, whereas a reduced speed is achieved by simultaneously supplying a full clutching current to clutch 147X and a reduced clutching current to clutch 148X. Motor 145X includes a series resistor 146X which causes the speed to fall with increased load so that the loading effect of applying both clutches also results in a reduced motor speed. It will be understood, of course, that motor 145X may be selected to have the proper speed-load characteristic so that resistor 146X may be unnecessary. Clutches 147X and 148X may be magnetic clutches of any desired type.

Within circuit 150X there are a pair of amplifiers 151X and 152X for supplying full clutching currents to clutches 147X and 148X respectively, and also a second pair of amplifiers 153X and 154X for supplying reduced currents to clutches 147X and 148X, respectively. Full speed of the carriage in the positive direction, for example, is therefore achieved by energizing amplifier 151X only, whereas reduced speed is achieved by also energizing amplifier 154X. Each of the four amplifiers may be a direct current amplifier responsive to an input signal of predetermined magnitude for supplying a predetermined output current.

The various carriage speeds and the respective signals produced within circuit 150X for controlling them may be conveniently tabulated as follows:

Table III

| Speed | Control Signals | Amplifiers Energized |
|---|---|---|
| Full Speed in the positive direction | $\overset{+}{Mx}$ | 151X |
| Reduced Speed in the positive direction | $\begin{cases}\overset{+}{Mx}\\ \overset{+}{Mxr}\end{cases}$ | $\begin{cases}151X\\ 154X\end{cases}$ |
| Full Speed in the negative direction | $\overset{-}{Mx}$ | 152X |
| Reduced Speed in the negative direction | $\begin{cases}\overset{-}{Mx}\\ \overset{-}{Mxr}\end{cases}$ | $\begin{cases}152X\\ 153X\end{cases}$ |

Each of the above digital motion control signals may be an "on-off" signal and may be expressed as a logical "and" function in terms of the input signals supplied to circuit 150X. Thus, the signal $\overset{+}{Mx}$ may be defined as having a 1-representing value when signal $Op$ is 1, indicating phase IV; when signal $Mx$ is 1, indicating that motion of the X carriage is desired; and when signal $Sx$ is 1, indicating motion in the positive X direction. This relationship may be expressed by the following equation:

$$(156X) \quad \overset{+}{Mx}=Op.Mx.Sx$$

In a similar manner the other control signals may be expressed by equations as follows:

$$(157X) \quad \overset{-}{Mx}=Op.Mx.\overline{Sx}$$
$$(158X) \quad \overset{-}{Mxr}=\overset{-}{Mx}.Mxr$$
$$(159X) \quad \overset{+}{Mxr}=\overset{+}{Mx}.Mxr$$

In Fig. 6 the function $Op.Mx$ is provided by an "and" circuit 155X and is supplied both to "and" circuit 156X and "and" circuit 157X where it is combined with signals $Sx$ and $\overline{Sx}$ for producing the functions $\overset{+}{Mx}$ and $\overset{-}{Mx}$, respectively. A cathode follower buffer stage 156XB is interposed between "and" circuit 156X and the utilization circuits to which signal $\overset{+}{Mx}$ is applied, including amplifier 151X and an "and" circuit 159X for producing signal $\overset{+}{Mxr}$. The mechanization of the remainder of circuit 150X is readily apparent from the above equations.

It will be noted that when the carriage reaches its desired location, signal $Mx$ changes from 1 to 0, thus changing both signals $\overset{+}{Mx}$ and $\overset{+}{Mxr}$ to 0 and simultaneously de-energizing both of the magnetic clutches.

It is not necessary to describe servo motor 145Y and motion control circuit 150Y since their structure and function are identical to those of servo motor 145X and circuit 150X, respectively. For example, circuit 150Y is responsive to signals $Op$, $Sy$, $My$, $\overline{Sy}$, and $Myr$ for producing control signals $\overset{+}{My}$, $\overset{-}{My}$, $\overset{+}{Myr}$, and $\overset{-}{Myr}$.

Efficient control of carriage position may also be provided by utilizing a closed hydraulic system in lieu of the pair of magnetic clutches described above. A carriage-actuating cylinder and piston may be provided having a separate oil chamber in each end, the output signal of each amplifier being then applied to control the entry of oil into the respective chamber.

PUNCH CONTROL CIRCUIT

Reference is now made to Fig. 7 which shows in diagrammatic form punch control circuit 170 of Fig. 1. Punching is to be performed during phase IV after both of the X and Y motion control signals $Mx$ and $My$ have gone to 0, hence the expression:

$$Pc=Op.\overline{Mx}.\overline{My}$$

where signal $Op$ is the "and" function $Rt.Rc$ as explained in connection with Fig. 2. Accordingly, Fig. 7 illustrates a three-terminal "and" circuit to which the signals $Op$ from sequence unit 110, $\overline{Mx}$, and $\overline{My}$ from the X and Y punch address circuits are applied and which produces an output signal $Pc$ having a 1-representing value when all of the input signals have 1-representing values.

It is not deemed necessary to show or describe in detail the apparatus within punching mechanism 180 for actuating the punching mechanism in response to a 1-representing value of signal $Pc$, since controls of this type are very well known in the art.

ABSOLUTE ADDRESS SYSTEM

Reference is now made to Figs. 8a, 8b and 8c wherein there is illustrated in schematic form the structure of punch address and comparison circuit 130X in accordance with an absolute address method of control. Figs. 8a and 8b considered together illustrate the entire circuit whereas Fig. 8c illustrates in greater detail an up-down absolute reference counter suitable for use in the circuit of Figs. 8a–8b. It will be convenient to discuss briefly the general theory of operation before describing the circuits in detail.

According to the absolute address method of control each address is specified with respect to an origin or reference position, for example, each punch location may be specified by means of two absolute numbers corresponding directly to its X and Y coordinates, respectively. It is therefore necessary for each of the X and Y punch address and comparison circuits to receive and store a first set of information corresponding to a desired carriage position and a second set of information corresponding to the instantaneous actual position, and to perform a comparison for the purpose of stopping the carriage when the two information sets are identical. According to the present invention the first set of information is provided by the program unit and is stored in a static storage register whereas the second set of information is provided by digital motion pulses actuating an absolute reference counter to count either up or down as necessary in order to continuously maintain a count representative of the actual carriage position.

It is, in general, necessary to specify separately each carriage position where any action is to occur. For example, in order to provide reduced carriage speed for a predetermined distance prior to the stopping point it is necessary to separately specify a reduced-speed location and a stopping location. It is also necessary to specify in the instruction whether or not any carriage motion is desired, the direction of carriage motion, and whether carriage motion is to be initiated at full speed.

Accordingly, a complete X address may include an X reduced-speed address, an X stop address, and various motion control signals such as $Mx$, $Sx$, and $Mxr$. The instruction then includes a marker bit, a complete X address, and a complete Y address, and in accordance with the control system described herein the entire instruction is arranged to form a single series.

In its general form, therefore, the circuit of Figs. 8a–8b includes a static storage register 131X for receiving and storing a complete X address; an absolute reference counter 132X responsive to motion pulses $Px$ for continuously representing the actual location of the X carriage; a reduced-speed comparison circuit 133X for producing a comparison signal $Cxr$ at the reduced-speed location; and a stopping point comparison circuit 134X for producing a signal Cxs at the desired carriage position; each being enclosed by dotted lines.

During phase III a complete X address is transferred into static storage register 131X, the information transfer being synchronized by means of clock pulses Cp from program unit 100. During phase IV the absolute reference counter 132X is responsive to motion pulses Px produced by motion detector 160X to count either up or down according to the direction of carriage travel as indicated by sign digit Sx. Most of the complete X address is maintained in static storage by register 131X throughout phase IV when a particular instruction is being performed; however, motion control signals Mxr and Mx may change their values during the performance of an instruction in response to comparison signals Cxr and Cxs, respectively, as will be explained.

In the circuit of Figs. 8a–8b a variety of codes are possible for specifying addresses and for the counting operation of the absolute reference counter 132X. According to the circuit specifically shown, however, all addresses and counts are specified in the straight binary code wherein each binary digit is given a weight of $2^{n-1}$, where $n$ corresponds to the digital place of the particular bit. The mechanization of the circuit of Figs. 8a–8b is also based upon the assumption that a work piece 8″ x 8″ is to be punched and that each motion detector develops an output pulse in response to carriage travel in increments of 1 mil.

Thus storage register 131X includes a primary bank of 13 flip-flops $X^r_1, X^r_2, X^r_4, \ldots X^r_{4096}$ having a capacity equal to the decimal number 8191; and a secondary bank of 7 flip-flops $X^s_1, X^s_2, X^s_4, \ldots X^s_{64}$ having a capacity equal to the decimal number 127. The absolute reference counter also includes 13 flip-flops $X^c_1, X^c_2, \ldots X^c_{4096}$ providing a total count capacity of 8191.

The primary bank of flip-flops in storage register 131X is utilized for receiving and storing a primary address representing the carriage location at which reduced speed is to be commenced, and the secondary bank of flip-flops receives and stores a secondary address representing the desired carriage stopping point. An economy of flip-flops for representing the secondary address is achieved by virtue of the fact that the stopping-point comparison signal Cxs developed by comparison circuit 134X may be made dependent upon and may be produced as a function of the previously produced reduced-speed comparison signal Cxr, as will be explained hereinafter.

Static storage register 131X also includes motion control flip-flops MX, SX, and MXR, utilized for storing motion control signals Mx, Sx, and Mxr, respectively, received from program unit 100 as part of the X address. Signal Sx included in the original instruction is either 1 or 0 according to the desired direction of carriage travel, and is stored in flip-flop SX throughout phase IV until signal Do is produced. Signals Mx and Mxr change during phase IV, hence it will be convenient to utilize the following table to indicate the sequence in which the changes occur.

Table IV

|  | Mxr | Mx |
|---|---|---|
| Original Instruction | 0 | 1 |
| Reduced-Speed (Cxr) | 1 | 1 |
| Stop (Cxs) | 1 | 0 |
| Reset (Do) | 0 | 0 |

Table IV indicates that signals Mxr and Mx included in the original instruction have values of 0 and 1, respectively. When the reduced-speed comparison signal Cxr is produced, signal Mxr is changed to 1 and when the stop comparison signal Cxs is produced, signal Mx is changed to 0. After completion of the punch the reset signal Do is operative to change signal Mxr to 0.

It is therefore apparent that a stopping point comparison is desired only if signal Mxr stored in flipflop MXR is 1 by virtue of reduced-speed comparison signal Cxr having been previously produced. The capacity of the secondary blank of flip-flops in the storage register need only be sufficient to represent the amount of reduced-speed travel which may be desired, and in the circuit of Fig. 8 is adequate to permit a maximum reduced-speed carriage travel of 127 counts or 127 mils. A numerical example will be helpful at this point to illustrate the comparison operations more clearly.

Let it be assumed that the desired X address is 475, corresponding to 475 mils from the reference point, and that it is desired to provide reduced speed for the last 100 mils of carriage travel. The complete primary and secondary addresses will then appear as follows.

Table V.—Independent address

|  | Decimal | Binary |
|---|---|---|
| Reduced-Speed Address | 375 | 0000101110111 |
| Stop Address | 475 | 0000111011011 |

By making the stopping comparison dependent upon a previous reduced-speed comparison the stop address may be abbreviated as follows.

Table VI.—Dependent addresses

|  | Decimal | Binary |
|---|---|---|
| Reduced-Speed Address | 375 | 0000101110111 |
| Stop Address | 475 | 1011011 |

It will be noted that the abbreviated stop address of Table VI actually represents the decimal value 91. This value will appear in the least significant 7 bits in counter 132X at counts of 91, 219, 347, 475, 603, 731. . . . The comparison signal Cxs cannot be produced at counts of 91, 219, or 347, however, as signal Mxr is still 0, but when signal Mxr becomes 1 immediately after count 375 it then becomes possible for comparison signal Cxs to be produced at count 475, thus stopping the motion of the X carriage.

In some instances the total amount of carriage travel required during the performance of an instruction may be small enough so that it is desirable to initiate the carriage motion at reduced speed, rather than at full speed. In such case signal Mxr included in the instruction has the initial value of 1, Table IV being applicable as in the usual situation except that the first step of the sequence is omitted.

The comparison function for producing signals Cxs, and which represents the structure of circuit 134X, may therefore be written as follows:

(134X)

$$Cxs = Rc \cdot Mxr \cdot (X^c_1 \cdot X^s_1 + \overline{X^c_1} \cdot \overline{X^s_1}) \cdot (X^c_2 \cdot X^s_2 + \overline{X^c_2} \cdot \overline{X^s_2}) \cdot$$
$$(X^c_4 \cdot X^s_4 + \overline{X^c_4} \cdot \overline{X^s_4}) \cdot (X^c_8 \cdot X^s_8 + \overline{X^c_8} \cdot \overline{X^s_8}) \cdot$$
$$(X^c_{16} \cdot X^s_{16} + \overline{X^c_{16}} \cdot \overline{X^s_{16}}) \cdot (X^c_{32} \cdot X^s_{32} + \overline{X^c_{32}} \cdot \overline{X^s_{32}}) \cdot$$
$$(X^c_{64} \cdot X^s_{64} + \overline{X^c_{64}} \cdot \overline{X^s_{64}})$$

It will be noted that signal Rc is also included in the above comparison function. The reason for this is that during the shifting in of an instruction in phase III, prior to the arrival of the marker bit in flip-flop RC, it would otherwise be possible for a spurious comparison signal to be produced.

Signal Cxs must set motion signal Mx to 0. Flipflop MX has a Ka input of the type described in connection with Figs. 3a and 3c, hence it is convenient to apply signal Cxs to the Ka input. The use of the Ka rather than the K input is necessary because clock pulses Cp are not available during phase IV, and it is undesirable to utilize the next motion signal P$x$ produced from motion of the X carriage since this would necessarily involve over-travel beyond the desired stopping point. As explained in connection with Figs. 3a and 3c the K input is pulsed only upon the occurrence of a clock pulse (the equivalent of which during phase IV is the motion signal P$x$).

In a similar manner the comparison function for producing reduced-speed signal C$xr$, and which represents the structure of circuit 133X, may be defined as follows:

(133X)

$$Cxr = Rc.(X^c{}_1.X^r{}_1 + \overline{X^c{}_1}.\overline{X^r{}_1}).(X^c{}_2.X^r{}_2 + \overline{X^c{}_2}.\overline{X^r{}_2}).$$
$$(X^c{}_4.X^r{}_4 + \overline{X^c{}_4}.\overline{X^r{}_4}).(X^c{}_8.X^r{}_8 + \overline{X^c{}_8}.\overline{X^r{}_8}). \ldots .$$
$$(X^c{}_{4096}.X^r{}_{4096} + \overline{X^c{}_{4096}}.\overline{X^r{}_{4096}})$$

Signal R$c$ is included as an "and" condition in the function for C$xr$ for the same reason that it is required in the function for C$xs$. Since signal C$xr$ must change signal M$xr$ from 0 to 1, it is applied to the J$a$ input of flip-flop MXR, which is of the type described in connection with Figs. 3a and 3c, having J, K, J$a$, and K$a$ inputs.

From the preceding discussion it is apparent that each instruction must include the primary address, the secondary address, and the initial values of motion control signals M$x$, S$x$, and M$xr$. A typical instruction corresponding to the example set forth above, and to the additional assumption that carriage motion is in the positive direction, would then appear as follows:

X PORTION OF INSTRUCTION

| M$xr$ | S$x$ | M$x$ | Reduced-Speed Address | Stop Address |
|---|---|---|---|---|
| 0 | 1 | 1 | 0000101110111 | 1011011 |

It will be noted that in the circuit of Fig. 8 motion control flip-flops MX, SX, and MXR and address storage register 131X comprise a continuous shifting register, suitable for shifting an instruction to the left through flip-flop RC of sequence unit 110 and hence into the program unit 100 during phase II and for shifting to the left an incoming instruction which is received from the program unit through circuit 130Y during phase III. The 1 and 0 input circuits of flip-flop X$^s{}_1$ are therefore coupled to the corresponding output circuits of a flip-flop MYR provided in circuit 130Y, and the primary and secondary output circuits of flip-flop MXR are coupled to the corresponding input circuits of flip-flop RC in sequence control unit 110.

A complete instruction includes not only the X addresses and motion signals as indicated above, but also the necessary Y addresses and motion control signals plus a marker bit. Assuming that the Y stopping point is 675, the reduced-speed point is 575, and that the carriage is to travel in the positive direction, the complete instruction in serial form as generated by the program unit is as follows:

COMPLETE INSTRUCTION

10110000101110111101101101100010001111110100011 where, reading from left to right, the first 1 is the marker bit; the next three bits 011 represent M$xr$, S$x$, and M$x$; 13-bit number 0000101110111 represents the X reduced-speed address; the 7-bit number 1011011 represents the X stop address; the next three bits 011 represent M$yr$, S$y$, and M$y$; the 13-bit number 0001000111111 represents the Y reduced-speed address; and the final 7-bit number 0100011 represents the Y stop address. Thus, the entire instruction contains 47 bits, including the marker bit and 23 bits each for the complete X and Y addresses.

A common reset circuit is provided for all of the flip-flops of address storage register 131X except flip-flop MX. Resetting of all of these flip-flops to 0 is accomplished either at the end of phase IV in response to signal D$o$ or in response to signal R$eo$ controlled by the operator. Accordingly, the output signal from circuit K$a$(N) in sequence control unit 110, previously described in connection with Fig. 3 is utilized. It may be noted that the application of reset signal D$o$ to flip-flop MX is not required since as previously indicated in Table IV flip-flop MX is already set to 0 in response to signal C$xs$. Signals D$o$ and R$eo$ are therefore combined as an "or" function in a reset circuit K$a$(MX) for controlling the K$a$ input of flip-flop MX.

As indicated previously in the descriptions of Figs. 1 and 6 circuit 130X supplies signals M$x$, M$xr$, S$x$, and $\overline{Sx}$ to circuit 150X for controlling the motion of the X carriage. Signal $\overline{Mx}$ is supplied to circuit 170 (Fig. 7) for actuating the punching mechanism.

Absolute reference counter 132X is responsive to carriage motion pulses P$x$ from X motion detector 160X to count up or down as necessary in order to continuously maintain a count representing instantaneous carriage position. Sign signals S$x$ and $\overline{Sx}$ produced by flip-flop SX in register 131X are utilized for controlling the counting direction, with counting up being performed in response to $Sx.Px$ and counting down being performed in response to $\overline{Sx}.Px$.

Reference is now made to Fig. 8c which illustrates several stages of a counter circuit suitable for use as counter 132X of Figs. 8a–8b. The circuit of Fig. 8c shows a simple binary cascade counter wherein motion signals P$x$ from X motion detector 160X are applied to both input circuits of the first flip-flop X$_1{}^c$ for continuously triggering it.

Each succeeding counting stage X$^c{}_j$ is coupled to the preceding stage by means of a carry circuit C$_x$ responsive to signal S$x$ for counting up and to signal $\overline{Sx}$ for counting down. The first carry circuit C$^1{}_x$ is shown in specific detail and the other carry circuits are shown as symbolic "and" circuits.

Carry circuit C$^1{}_x$ receives signals X$^c{}_1$ and $\overline{X^c{}_1}$ produced by flip-flop X$^c{}_1$ and applied to separate input terminals 10 and 20. Terminal 10 is connected to one input terminal of a first "pulse-and" circuit C$^1{}_x$—1 and terminal 20 is connected to a similar input terminal of a second "pulse-and" circuit C$^1{}_x$—2. "Pulse-and" circuit C$^1{}_x$—1 is operative to produce a negative output pulse on leads 30 and 40 actuating the next flip-flop stage X$^c{}_2$ whenever signal S$x$ applied to the second input terminal of circuit C$^1{}_x$—1 is in a high-level state and when the signal X$^c{}_1$ applied to the other input terminal changes from a high level to a low level.

In a similar manner signal $\overline{Sx}$ is applied to the other input terminal of "pulse-and" circuit C$^1{}_x$—2; circuit C$^1{}_x$—2 being operative to produce negative triggering signals on leads 30 and 40 when signal $\overline{Sx}$ is in a high-level state and when signal $\overline{X^c{}_1}$ changes from a high level to a low level.

While a particular form of "pulse-and" circuits C$^1{}_x$—1 and C$^1{}_x$—2 is shown in Fig. 8c, these circuits will not be described in further detail since they are described and claimed in copending patent application Serial No. 327,133 for "Diode, Pulse-Gating Circuits" by Richard D. Forrest, filed December 20, 1952.

Essentially carry circuit C$^1{}_x$ may be defined as providing the following operation:

$$(C^1{}_x) \quad 1X^c{}_2 = 0X^c{}_2 = Sx.^pX^c{}_1 + \overline{Sx}.^p\overline{X^c{}_1}$$

where the signals $^pX^c{}_1$ and $^p\overline{X^c{}_1}$ indicate negative-going pulse changes created when signal X$^c{}_1$ changes from a high level to a low level and when signal $\overline{X^c{}_1}$ changes from a high level to a low level, respectively.

The first counting stage X$^c{}_1$ is triggered successively by each motion signal P$x$. Thus, stage X$^c{}_1$ is triggered successively on and off by successive motion pulses during the X carriage motion. Counting stage $Xc_2$ then is triggered on and off whenever a carry signal is developed by circuit $C^1_x$. During counting-up operations or positive X carriage motion a binary carry signal is effective to trigger stage $Xc_2$ whenever signal $Xc_1$ changes from high level to low level. During count-down operations, or negative carriage motion, stage $Xc_2$ is triggered successively on and off for each occurrence or change in signal $\overline{Xc_1}$ from a high level to a low level providing the desired count down carry. In a similar manner each of the other carry stages $C^j_x$ actuates the corresponding counting stage whenever the preceding counting stage changes from a high level to a low level during counting-up operations and from a low level to a high level during counting-down operations.

The complete counting functions of the binary up-down counter of Fig. 8a may then be summarized as follows:

$$1Xc_1 = 0Xc_1 = Px$$

$(C^1_x)\quad 1Xc_2 = 0Xc_2 = Sx \cdot {}^pXc_1 + \overline{Sx} \cdot {}^p\overline{Xc}$ $(C^2_x)\quad 1Xc_4 = 0Xc_4 = Sx \cdot {}^pXc_2 + \overline{Sx} \cdot {}^p\overline{Xc_2}$

. . .       . . .

$(C_x{}^{2048})\quad 1Xc_{4096} = 0Xc_{4096} = Sx \cdot {}^pXc_{2048} + \overline{Sx} \cdot {}^p\overline{X}c_{2048}$

RELATIVE ADDRESS SYSTEM

Reference is now made to Figs. 9 and 9a which illustrate in schematic form a punch address and comparison circuit 130X in accordance with a relative address method of control. Fig. 9 illustrates the entire circuit whereas Fig. 9a illustrates in greater detail a combined shifting register and counter circuit suitable for use in the circuit of Fig. 9. Before considering the circuits in detail it will be helpful to discuss the general characteristics of the relative address method of control.

According to the relative address method each instruction takes account only of the "relative address," which may be defined as the difference between the previously desired carriage position and the presently desire carriage position. It is therefore convenient to utilize the instruction to preset a counter circuit whereby the number of counts remaining between the preset count and a predetermined comparison count is equal to the relative address. The counter must be mechanized to count in one particular direction, which may be either up or down. If the counter is mechanized to count down, then it must be preset at a count corresponding to the comparison count plus the relative address; for example, where the comparison count is 0 and the relative address is 102, the counter must be preset to a count of 102. If on the other hand the counter is mechanized to count up, then the preset count must be less than the comparison count by the amount of the relative address; for example, if a counter having a maximum capacity of 127 counts is utilized, with 127 as the comparison count, and if 102 mils of carriage travel is desired, then the counter must be preset to a count of 25.

In the circuits specifically shown and described herein the counter is mechanized to count up. A maximum count of 3999 is provided in order to permit a total carriage travel of 3999 mils. The zero or 4000th count is utilized as the comparison count, hence each address is entered as the 4000's complement of the associated relative address.

According to the system of Fig. 1 the relative address method of control requires additional circuitry in order to provide reduced-speed operation, and in order to position the carriage in a manner which will compensate for any error which may have occurred in the previous positioning of the carriage. Thus, in its general form the circuit of Fig. 9 includes a counter and shifting register 136X; a motion-starting comparison circuit 137X; a reduced-speed comparison circuit 138X; an error-compensating and stopping comparison circuit 140X; and motion control flip-flops SX and MX. Counter 136X and flip-flop SX together comprise a static storage register into which a complete X address may be shifted.

Shifting register and counter 136X receives an X address during phase III (the shifting being synchronized by means of clock pulses Cp from program unit 100), and during carriage motion counts in a predetermined cycle in response to digital motion pulses Px received from motion detector 160X. Since the X address supplied to circuit 136X specifies the next desired carriage location with respect to the previously desired location, there is one numerical value of the address which corresponds to the situation where no carriage motion is desired. For any other value of the address, comparison circuit 137X produces a signal for setting flip-flop MX to 1 in order to initiate carriage motion. The reduced speed signal Mxr is produced by comparison circuit 138X when the carriage reaches a predetermined distance from the stopping point. At the desired stopping point, computed by taking into account any error in the previous carriage position, circuit 140X produces the stop signal Cxs for setting flip-flop MX to 0 in order to stop the X carriage.

A variety of codes are of course possible for specifying the addresses and for performing the various functions of the circuit of Fig. 9. The specific code which has been selected for illustration, however, is the binary-coded decimal system wherein a separate series of four bits is utilized to represent each decimal digit. More specifically, the bits within each series are assigned decimal weights of 1, 2, 4, and 8, respectively, in accordance with the straight binary code. Circuit 136X is assumed to have a total count capacity of 3999 and therefore includes 14 stages designated as $X^1_1$, $X^2_1$, $X^4_1$, $X^8_1$, $X^1_{10}$, $X^2_{10}$, ... $X^2_{1000}$. Circuit 136X when operating as a counter during carriage motion is responsive to motion signals Px to count up; the stopping comparison is made by circuit 140X in order to stop the carriage on the zero or 4000th count; therefore, each address is specified as the 4000's complement of the relative address, as previously defined. For example, if the previously desired position of the X carriage corresponded to an absolute reference point of 250 mils and the carriage is to be moved to an absolute reference point corresponding to 475 mils, the X address appears in the instruction as follows:

$$X \text{ address} = 4000 - (475 - 250)$$
$$= +3775$$
$$\frac{Sx\quad 3\quad 7\quad 7\quad 5}{1\quad 0011\quad 0111\quad 0111\quad 0101}$$

In accordance with this method of representing a desired address, comparison circuit 137X produces an output signal Nza for setting the carriage in motion whenever a non-zero address is shifted into the counter. Also, comparison circuit 140X is mechanized to produce stopping signal Cxs when counter 136X reaches the full or 0 state, corresponding to a count of 4000, in the absence of an error in the previous carriage position. The reduced speed comparison circuit 138X is mechanized to produce and maintain reduced-speed signal Mxr throughout a specified amount of carriage travel, for example, the last 100 mils.

For reasons which will be explained hereinafter, comparison signal Nza is produced by circuit 137X one time interval before the instruction has been completely shifted in. At this time the first (most significant) bit of the X address has been shifted into flip-flop $X^1_{1000}$, hence the last (least significant) bit is stored at that time interval in the last flip-flop SY of circuit 130Y. Accordingly, the comparison function for producing signal Nza, and which defines the structure of circuit 137X, may be expressed as follows:

(137X) $\quad Nza = X^1_{1000} + X^8_{100} +$ $\qquad X^4_{100} + X^2_{100} + X^1_{100} + \ldots X^1_1 + Sy$ It will be noted from Fig. 9 that flip-flop MX is set to 1 in response to a signal produced by its 1-input circuit 1MX defined as follows:

(1MX) $1MX = \overline{Rc} \cdot Sx \cdot Nza \cdot Cp$

Thus, in order for flip-flop MX to be set to 1 the marker bit must not have reached flip-flop RC (see Fig. 2); signal Sx must be 1 indicating that the marker bit is stored in flip-flop SX; signal Nza must be 1 indicating a non-zero address; and the clock pulse Cp must be present. The reason for this mechanization is that even if the address were 0 a signal Nza would be produced in response to the shifting of the marker bit through circuit 136X. Hence, the mechanization of circuit 1MX provides for triggering flip-flop MX to 1 during a specific time interval when the location of the marker bit is specified, namely, when the marker bit is in flip-flop SX during the time interval preceding its arrival in flip-flop RC. It would also be possible to trigger flip-flop MX one time interval later; however, as previously pointed out in connection with Fig. 2 the clock pulses Cp are unavailable after the arrival of the marker bit in flip-flop RC, hence it would be necessary in such case to reset the flip-flop by means of its Ja input circuit rather than the J or conventional 1-input circuit.

Comparison circuit 138X has a fixed mechanization for providing reduced-speed operation throughout the last 100 mils of carriage travel. Thus, the function for signal MXR, and which defines the structure of circuit 138X, may be expressed as follows:

(138X) $MXR = X^2{}_{1000} \cdot X^1{}_{1000} \cdot X^8{}_{100} \cdot X^1{}_{100} \cdot Rc$ the above mechanizaiton providing a comparison to indate whenever the count stored in counter 136X is 3900 or greater, namely, any count from 3900 to 3999, inclusive.

The structure and function of error-compensating and stopping-comparison circuit 140X will now be explained. Circuit 140X includes an enabling network 141X; an error counter 142 X; a sign storage unit 143X; and an output comparison circuit 144X. The purpose of the enabling network 141X is to permit the error counter to operate in response to motion pulses Px during the terminal portion of carriage travel so as to recognize any over-travel. The error counter 142X itself is reversible in response to sign signals Sx and $\overline{Sx}$ to count either up or down according to the direction of carriage motion. Sign storage unit 143X is provided for storing the sign digit of the previous instruction, since the method of compensating for any previous over-travel obviously depends upon whether the present direction of carriage travel is the same as, or different from, the previous direction. Finally, output comparison circuit 144X produces an output signal Cxs for stopping the carriage motion when the desired position in accordance with the present instruction has been reached.

The design of circuit 140X is based upon the assumption that a maximum of 3 mils of over-travel is possible in stopping the carriage at any particular location, hence the error counter includes two binary stages for representing any decimal count from 0 to 3, inclusive. The counter is mechanized to count up when carriage motion is positive ($Sx = 1$) and to count down when carriage motion is negative ($\overline{Sx} = 1$). In the normal operation of the counter, when there has been no carriage over-travel in performing the preceding instruction, the error counter is initially in its 0 state and is enabled by circuit 141X during count 3996 of counter 136X. Thus, in response to the next four motion pulses Px, counter 136X counts through the remainder of its cycle back to 0; the error counter counts from 0 to 1, 2, 3, and back to 0; and upon the return of the error counter to its zero state, comparison circuit 144X produces signal Cxs for stopping the carriage.

Before describing the error counter in detail it will be expedient to briefly describe the enabling network 141X.

Enabling network 141X includes a flip-flop X3996 and a comparison circuit Cf3995 for setting the associated flip-flop to 1. The comparison circuit develops an output signal in response to the 3995th count state existing in counter 136X, and the next motion pulse Px, which sets counter 136X to count 3996, also triggers the flip-flop X3996 to 1. The expression for the comparison signal is as follows:

$1X3996 =$
$X^2{}_{1000} \cdot X^1{}_{1000} \cdot X^8{}_{100} \cdot X^1{}_{100} \cdot X^8{}_{10} \cdot X^1{}_{10} \cdot X^4{}_1 \cdot \overline{X^2{}_1} \cdot X^1{}_1 \cdot Px \cdot Rc$ After completion of the punch flip-flop X3996 must be reset by signal Do, hence $0X3996 = Do$ The output signal of flip-flop X3996 is applied to both stages of the error counter 142X for enabling it to operate after the appearance of the 3996th count state in counter 136X until reset signal Do is produced upon completion of the punch.

Error counter 142X includes two flip-flop $C^1{}_x$ and $C^2{}_x$ representing the less significant and the more significant binary digits, respectively. Flip-flop $C^1{}_x$ is triggered continuously during the enabling period in response to each motion pulse Px. The mechanization of the input circuits of flip-flop $C^2{}_x$ is such as to provide counting up when Sx is 1, and counting down when $\overline{Sx}$ is 1. Accordingly the mechanization functions are as follows:

$$1C^1{}_x = 0C^1{}_x = X^{3996} \cdot Px$$

(142X)

$$1C^2{}_x = 0C^2{}_x = (Sx \cdot C^1{}_x + \overline{Sx} \cdot \overline{C^1{}_x}) \cdot X^{3996} \cdot Px$$

The complete counting cycle is given in Table VII.

Table VII

| Decimal Count | $C^2{}_x$ | $C^1{}_x$ | Count Up | |
|---|---|---|---|---|
| 0 | 0 | 0 | ↓ | |
| 1 | 0 | 1 | | |
| 2 | 1 | 0 | | |
| 3 | 1 | 1 | ↓ | Count Down |

It is apparent that whereas the error counter is normally operative to count through its entire cycle before the stopping signal Cxs is produced, in the event of over-travel of the carriage in performing the preceding instruction this normal counting cycle must be either diminished or augmented. More specifically, where the carriage direction is the same in both instances the normal counting cycle must be diminished by the amount of the over-travel, but where the carriage direction is different for the two instructions the normal counting cycle must be augmented by the amount of the over-travel.

Sign storage unit 143X includes a flip-flop $S^p{}_x$ and three logical gating circuits for controlling the 1 and 0 input circuits thereof. The sign digit of the previous instruction must be available in flip-flop $S^p{}_x$ for determining the proper error compensation to be made in carrying out the present instruction; therefore, the sign digit of the present instruction must, at some time while it is still available, be shifted into flip-flop $S^p{}_x$. The timing of this shifting operation is of critical importance.

It has previously been pointed out that during the enabling period and prior to the time when stop signal Cxs is produced the error counter 142X must count either a full cycle less previous over-travel, or a full cycle plus previous over-travel. The manner in which the counting cycle takes place, and the shifting of the sign digit into flip-flop $S^p{}_x$, will be explained in the following paragraphs in conjunction with subsequent Table VIII.

Where the previous and present directions of carriage motion are the same, as indicated by signals Sx and $S^p{}_x$ being equal, only a full cycle minus the previous over-travel is required. When the error counter 142X reaches the decimal count 0 (binary count 00) signal $Cxs$ may therefore be produced, and at the same time signal $Sx$ may conveniently be shifted into flip-flop $S^p{}_x$ for use during the following instruction period. This type of counting sequence is illustrated in the first case in Table VIII where both previous and present count directions are "down" and counting proceeds in the negative direction, and in the second case where both count directions are "up" and counting proceeds in the positive direction.

Where the previous and present directions of carriage motion are different, as indicated by signals $Sx$ and $S^p{}_x$ being initially of opposite values, a full counting cycle plus the previous over-travel is required. The error counter therefore reaches the decimal count 0 twice during the counting sequence, as illustrated in the third and fourth cases of Table VIII. Upon the first occasion when the error counter reaches the decimal count 0 (indicated in the table as binary 00) it is therefore convenient to shift signal $Sx$ into flip-flop $S^p{}_x$. During the remaining full counting cycle signals $Sx$ and $S^p{}_x$ are therefore equal, and when the error counter arrives at the binary 00 count the second time the comparison for producing stopping signal $Cxs$ may be made in the same manner as indicated above.

Table VIII

| Count Direction | | Previous Over-travel in mils | Counting Sequence |
|---|---|---|---|
| Previous | Present | | |
| down | down | 1 | 11—10—01—00 |
| | | 2 | 10—01—00 |
| | | 3 | 01—00 |
| up | up | 1 | 01—10—11—00 |
| | | 2 | 10—11—00 |
| | | 3 | 11—00 |
| down | up | 1 | 11—00—01—10—11—00 |
| | | 2 | 10—11—00—01—10—11—00 |
| | | 3 | 01—10—11—00—01—10—11—00 |
| up | down | 1 | 01—00—11—10—01—00 |
| | | 2 | 10—01—00—11—10—01—00 |
| | | 3 | 11—10—01—00—11—10—01—00 |

Accordingly, the mechanization functions for controlling flip-flop $S^p{}_x$ are as follows:

(143X)
$$1S^p{}_x = Sx \cdot \overline{C^2{}_x} \cdot \overline{C^1{}_x} \cdot Px$$
$$0S^p{}_x = \overline{Sx} \cdot \overline{C^2{}_x} \cdot \overline{C^1{}_x} \cdot Px$$

In accordance with the above discussion comparison circuit 144X may be mechanized as follows:

$$Cxs = \overline{C^2{}_x} \cdot \overline{C^1{}_x} \cdot (S_x \cdot S^p{}_x + \overline{S_x} \cdot \overline{S^p{}_x}) \cdot Px$$

The mechanization actually shown in Fig. 9 is slightly different from this, however. It is assumed that the desired carriage position actually corresponds to the zero or 00 count of the error counter. It is therefore desirable to form a comparison from the previous count so that the same pulse $Px$ which sets the counter to zero will also set flip-flop MX to 0. During positive motion or counting up the comparison is therefore made with binary count state 11 (decimal 3) as indicated by the condition:

$$C^2{}_x \cdot C^1{}_x = 1$$

During negative travel or counting down the comparison is made on the basis of binary count 01 (decimal 1) represented by:

$$\overline{C^2{}_x} \cdot C^1{}_x = 1$$

Accordingly, comparison circuit 144X as shown in Fig. 9 is mechanized according to the expression:

(144X) $\quad Cxs = [Sx \cdot S^p{}_x \cdot C^2{}_x \cdot C^1{}_x + \overline{Sx} \cdot \overline{S^p{}_x} \cdot \overline{C^2{}_x} \cdot C^1{}_x] \cdot Px$ It is assumed that resetting circuits (not shown) of the types described in connection with Figs. 3a, 3b, and 3c are utilized wherever necessary throughout the circuit of Fig. 9. For example, it is necessary to reset flip-flops MX, X3996, $C^1{}_x$, $C^2{}_x$, and $S^p{}_x$ to 0 prior to the commencement of a punching program, by means of signal Reo (not shown).

Reference is now made to Fig. 9a illustrating in schematic form several stages of a combined shifting register and counter suitable for use as circuit 136X of Fig. 9. The circuit of Fig. 9a is mechanized to shift in response to applied clock pulses $Cp$; to count upward in response to digital motion pulses $Px$; or to be reset to a zero state in response to reset signals $Reo + Do$.

It will be noted from Fig. 9a that the reset signals are applied to the $Ka$ input circuits of the respective flip-flops, although it will be understood as previously explained in connection with Figs. 3a, 3b, and 3c that the $Ka$ input is utilized in preference to the K input solely for the purpose of simplifying the gating circuits.

In accordance with the code previously specified in connection with the description of Fig. 9 the circuit of Fig. 9a includes a first 4-stage binary counter comprising flip-flops $X^1{}_1$, $X^2{}_1$, $X^4{}_1$, and $X^8{}_1$; a second binary counter comprising stages $X^1{}_{10}$, $X^2{}_{10}$, $X^4{}_{10}$, $X^8{}_{10}$; a third binary counter comprising stages $X^1{}_{100}$, $X^2{}_{100}$, $X^4{}_{100}$, and $X^8{}_{100}$; and a fourth counter comprising stages $X^1{}_{1000}$ and $X^2{}_{1000}$. A carry circuit $C_1$ is provided for supplying a carry signal from the first counter to the second counter, and carry circuits $C_2$ (not shown) and $C_3$ provide successively higher place carry signals for successive counters. Each of the first three counters is of course mechanized to count decimal numbers from 0 to 9, inclusive, whereas the fourth counter is mechanized to count only decimal numbers from 0 to 3, inclusive. Complete logical equations for the circuit of Fig. 9a are as follows:

| Flip-Flop Input Signal | Shift | Count | Voltage-Level Reset |
|---|---|---|---|
| $1X^1{}_1$ | $= Sy \cdot Cp$ | $+ Px$ | |
| $0X^1{}_1$ | $= \overline{Sy} \cdot Cp$ | $+ Px$ | $+ (Reo + Do)$ |
| $1X^2{}_1$ | $= X^1{}_1 \cdot Cp$ | $+ X^1{}_1 \cdot \overline{X^8{}_1} \cdot Px$ | |
| $0X^2{}_1$ | $= \overline{X^1{}_1} \cdot Cp$ | $+ X^1{}_1 \cdot \overline{X^8{}_1} \cdot Px$ | $+ (Reo + Do)$ |
| $1X^4{}_1$ | $= X^2{}_1 \cdot Cp$ | $+ X^1{}_1 \cdot X^2{}_1 \cdot Px$ | |
| $0X^4{}_1$ | $= \overline{X^2{}_1} \cdot Cp$ | $+ X^1{}_1 \cdot X^2{}_1 \cdot Px$ | $+ (Reo + Do)$ |
| $1X^8{}_1$ | $= X^4{}_1 \cdot Cp$ | $+ X^1{}_1 \cdot X^2{}_1 \cdot X^4{}_1 \cdot Px$ | |
| $0X^8{}_1$ | $= \overline{X^4{}_1} \cdot Cp$ | $+ X^1{}_1 \cdot Px$ | $+ (Reo + Do)$ |

$[C_1 = X^1{}_1 \cdot X^8{}_1]$

| | | | |
|---|---|---|---|
| $1X^1{}_{10}$ | $= X^8{}_1 \cdot Cp$ | $+ C_1 \cdot Px$ | |
| $0X^1{}_{10}$ | $= \overline{X^8{}_1} \cdot Cp$ | $+ C_1 \cdot Px$ | $+ (Reo + Do)$ |
| $1X^2{}_{10}$ | $= X^1{}_{10} \cdot Cp$ | $+ X^1{}_{10} \cdot \overline{X^8{}_{10}} \cdot C_1 \cdot Px$ | |
| $0X^2{}_{10}$ | $= \overline{X^1{}_{10}} \cdot Cp$ | $+ X^1{}_{10} \cdot \overline{X^8{}_{10}} \cdot C_1 \cdot Px$ | $+ (Reo + Do)$ |
| $1X^4{}_{10}$ | $= X^2{}_{10} \cdot Cp$ | $+ X^1{}_{10} \cdot X^2{}_{10} \cdot C_1 \cdot Px$ | |
| $0X^4{}_{10}$ | $= \overline{X^2{}_{10}} \cdot Cp$ | $+ X^1{}_{10} \cdot X^2{}_{10} \cdot C_1 \cdot Px$ | $+ (Reo + Do)$ |
| $1X^8{}_{10}$ | $= X^4{}_{10} \cdot Cp$ | $+ X^1{}_{10} \cdot X^2{}_{10} \cdot X^4{}_{10} \cdot C_1 \cdot Px$ | |
| $0X^8{}_{10}$ | $= \overline{X^4{}_{10}} \cdot Cp$ | $+ X^1{}_{10} \cdot C_1 \cdot Px$ | $+ (Reo + Do)$ |

$[C_2 = X^1{}_{10} \cdot X^8{}_{10} \cdot C_1]$

| | | | |
|---|---|---|---|
| $1X^1{}_{100}$ | $= X^8{}_{10} \cdot Cp$ | $+ C_2 \cdot Px$ | |
| $0X^1{}_{100}$ | $= \overline{X^8{}_{10}} \cdot Cp$ | $+ C_2 \cdot Px$ | $+ (Reo + Do)$ |
| $1X^2{}_{100}$ | $= X^1{}_{100} \cdot Cp$ | $+ X^1{}_{100} \cdot \overline{X^8{}_{100}} \cdot C_2 \cdot Px$ | |
| $0X^2{}_{100}$ | $= \overline{X^1{}_{100}} \cdot Cp$ | $+ X^1{}_{100} \cdot \overline{X^8{}_{100}} \cdot C_2 \cdot Px$ | $+ (Reo + Do)$ |
| $1X^4{}_{100}$ | $= X^2{}_{100} \cdot Cp$ | $+ X^1{}_{100} \cdot X^2{}_{100} \cdot C_2 \cdot Px$ | |
| $0X^4{}_{100}$ | $= \overline{X^2{}_{100}} \cdot Cp$ | $+ X^1{}_{100} \cdot X^2{}_{100} \cdot C_2 \cdot Px$ | $+ (Reo + Do)$ |
| $1X^8{}_{100}$ | $= X^4{}_{100} \cdot Cp$ | $+ X^1{}_{100} \cdot X^2{}_{100} \cdot X^4{}_{100} \cdot C_2 \cdot Px$ | |
| $0X^8{}_{100}$ | $= \overline{X^4{}_{100}} \cdot Cp$ | $+ X^1{}_{100} \cdot C_2 \cdot Px$ | $+ (Reo + Do)$ |

$[C_3 = X^1{}_{100} \cdot X^8{}_{100} \cdot C_2]$

| | | | |
|---|---|---|---|
| $1X^1{}_{1000}$ | $= X^8{}_{100} \cdot Cp$ | $+ C_3 \cdot Px$ | |
| $0X^1{}_{1000}$ | $= \overline{X^8{}_{100}} \cdot Cp$ | $+ C_3 \cdot Px$ | $+ (Reo + Do)$ |
| $1X^2{}_{1000}$ | $= X^1{}_{1000} \cdot Cp$ | $+ X^1{}_{1000} \cdot C_3 \cdot Px$ | |
| $0X^2{}_{1000}$ | $= \overline{X^1{}_{1000}} \cdot Cp$ | $+ X^1{}_{1000} \cdot C_3 \cdot Px$ | $+ (Reo + Do)$ |

SUMMARY

It is therefore apparent that the present invention provides a completely digital electronic system for automatically controlling the operation of a punch press in the manner described. Although a particular mechanization has been described, it is, of course, to be understood that the invention is not limited thereto.

For example, in controlling the position of a movable part such as the X and Y carriages described, the speed of the moving part may be increased or decreased in a stepwise fashion in response to any desired number of discrete control signals. In lieu of a magnetic tape as specifically illustrated any data storage unit utilizing a magnetic drum or disk, or punched tape or cards, may, of course, be utilized, appropriate "on-off" and "read-write" controls being provided.

It is also apparent that the present invention provides a great deal of flexibility in modifying a program at any time to incorporate engineering changes. It will, of course, be understood that in some applications it may be desirable to employ a bank of similar machines, each automatically controlled by means of a separate program unit, but wherein only one of the machines is equipped with program preparation features, the programs supplied to the other machines being obtained by copying the "master" program prepared on the one machine. In some situations it may also be economically justifiable to utilize a single program unit for controlling two or more similar machines in a parallel operation. Modifications necessary in order to carry out such objectives will be readily apparent to those skilled in the art.

An important feature of the present invention is the application of high-speed control whereby the production rate of a particular machine may be substantially increased over the rate obtainable under the control of a skilled operator or under other systems of automatic control. It has been assumed throughout the description that the particular use requires an accuracy which is well within the capabilities of the machine; accordingly, the particular mechanization shown is directed toward obtaining maximum economy by permitting a nominal error to occur in each individual operation, but eliminating the cumulative effect of errors upon subsequent operations. It will be apparent that if the most economical result requires greater accuracy of control, the system of the present invention may be readily adapted accordingly. For example, two or more reduced-speed levels may be employed for the purpose of minimizing the error in stopping the moving part at a desired location.

In the absolute address method of control which has been described, provision is made for establishing any desired amount of reduced speed travel of the carriage prior to the stopping point, although it is of course necessary to specify the requirement anew in each instruction of the entire program. The advantage of this method is that, as actual experience has demonstrated, it may be desirable to vary the amount of reduced-speed travel from one instruction to the next. In the relative address method of control, on the other hand, there has been described a circuit mechanization which provides a fixed amount of reduced-speed travel (100 mils in the example). The advantage of this method is that the instruction is abbreviated inasmuch as the reduced-speed information need not be specified in the instruction.

It has been pointed out that the digital nature of the control provided by the present invention has many advantages. A very complicated machine tool operation may be specified by an operator, who, though familiar with the machine language may have no particular knowledge as to the machine operation. The digital control feature readily adapts itself to permanent recording by means of which repetitive operations may be most efficiently and economically performed. A stored program may, for example, be filed away until a need for particular replacement parts develops, and may then be utilized to provide the parts without the necessity of preparing expensive dies or the time delay and expense of training a human operator to control the machine.

What is claimed as new is:

1. In a system including a machine tool and an electronic digital computer for automatically controlling the tool to perform a series of operations in accordance with a stored program wherein each operation is specified by means of a corresponding digitally coded instruction, the combination comprising: a movable part; position control means including a servomotor coupled to the part for moving the part along a particular axis, and a motion control circuit coupled to said servomotor for controlling the operation thereof; a motion detector for detecting the motion of the part along said axis and for generating electrical pulses representing said motion, one pulse being generated upon the completion of each predetermined increment of travel of the part along said axis; a program unit selectively operable to convert the instructions contained in the stored program into corresponding sets of electrical control signals; address and comparison circuit means including an address storage register coupled to the program unit for receiving therefrom and temporarily storing a set of electrical control signals representing a desired position of the part, a counting circuit coupled to said motion detector and responsive to said electrical pulses for maintaining a count continuously representative of the actual position of the part along said axis, and a comparison circuit for producing an output signal when said count corresponds to said set of electrical control signals; operation control means coupled to the tool and to said comparison circuit and responsive to said output signal for actuating the tool to perform an operation; and means for selectively operating said program unit.

2. In a system including a machine tool and an electronic digital computer for automatically controlling the tool to perform a series of operations in accordance with a stored program wherein each operation is specified by means of a corresponding digitally coded instruction, the combination comprising: a movable part; position control means including a servomotor coupled to the part for moving the part along a particular axis, and a motion control circuit coupled to said servomotor for controlling the operation thereof; a motion detector for detecting the motion of the part along said axis and for generating electrical pulses representing said motion, one pulse being generated upon the completion of each predetermined increment of travel of the part along said axis; a program unit selectively operable to convert the instructions contained in the stored program into corresponding sets of electrical control signals; address and comparison circuit means including an address storage register coupled to the program unit for receiving therefrom and temporarily storing a set of electrical control signals representing a desired position of the part, a counting circuit coupled to said motion detector and responsive to said electrical pulses for maintaining a count continuously representative of the actual position of the part along said axis, and comparison means coupled to said address storage register and to said counting circuit for producing an output signal when said actual position corresponds to said desired position; operation control means coupled to the tool and to said comparison means and responsive to said output signal for actuating the tool to perform an operation; and means for selectively operating said program unit.

3. An electronic digital computer for automatically controlling a machine tool to perform a series of predetermined operations with a tool on the work determined by a stored program wherein each operation is specified by means of a corresponding digitally coded instruction, each instruction specifying both a relative location of the work with respect to the tool and an operation to be performed at said location, said computer comprising: a program unit selectively operable to convert the stored program into sets of electrical control signals respectively corresponding to successive instructions; a storage register coupled to said program unit and adapted to receive therefrom and to temporarily store at one time one set of electrical control signals representing a particular instruction; sequence control means coupled to said storage register and to said program unit for controlling the transfer of the program into said storage register, one instruction at a time; position control and detection apparatus for positioning the work at a desired location specified by said particular instruction, said apparatus comprising a prime mover for moving the work along a predetermined axis, a motion control circuit coupled to said storage register and to said prime mover and responsive to said one set of electrical control signals for controlling the motion of the work in either a forward or a reverse direction, and a motion detector coupled to the work for producing an electrical motion signal upon completion of each predetermined increment of travel of the work along said axis; a counting circuit coupled to said motion detector and responsive to said electrical motion signals for counting them to generate a set of count signals continuously representing the actual position of the work along said axis; a comparison circuit coupled to said counting circuit and to said storage register for producing an output signal when said set of count signals corresponds to said desired location; operation control means coupled to said comparison circuit and to the tool and responsive to said output signal for initiating each operation of the tool; and a done device connected to the tool and coupled to said storage register and to said sequence control means and operable upon completion of each operation of the tool for conditioning said storage register and said sequence control means to transfer the next instruction from said program unit into said storage register.

4. A digital electronic system for automatically controlling, in accordance with a previously prepared program comprising a series of separate instructions, a punching machine of the type having X and Y carriages for supporting flat-work to be punched and a punching mechanism having a punching stroke and a return stroke, each separate instruction specifying a particular punch location and including a plurality of binary signals representing the desired positions of the X and Y carriages for the particular punch location and the required direction of travel of the X and Y carriages from a previous punch location to the particular punch location, said system comprising: a program unit for storing the program and for generating instruction signals; X and Y punch address and comparison circuits for receiving one instruction at a time and temporarily storing said instruction during the performance thereof; information transfer means, connected to said program unit, and coupled to said X and Y punch address and comparison circuits for applying said instruction signals thereto when an instruction is to be entered therein; a sequence control unit coupled to said program unit and producing sequencing signals for controlling the transfer of an instruction from said program unit into said X and Y punch address and comparison circuits; X and Y motion control means coupled to said X and Y punch address and comparison circuits, respectively, and coupled to the X and Y carriages, respectively, for controlling the motion thereof in accordance with an instruction stored in said punch address and comparison circuits; X and Y motion detectors, each being coupled to the associated X and Y carriage for producing motion pulses Px and Py indicative of increments of travel of the associated carriage, said X and Y punch address and comparison circuits being responsive to said motion pulses Px and Py, respectively, for producing X and Y comparison signals, respectively, indicating when the X and Y carriages are at the desired positions, said X and Y motion control circuits being responsive to said X and Y comparison signals, respectively, for stopping the motion of the respective carriages; a punch control circuit responsive to said X and Y comparison signals and to said sequencing signals for actuating the punching mechanism when the particular punch location has been reached; and a device responsive to the return stroke of the punching mechanism upon completion of the punch for producing a signal Do indicating that the punch has been completed and that a new instruction may be entered, said device being coupled to said X and Y punch address and comparison circuits, whereby, in response to said signal Do, said address and comparison circuits are reset to a condition suitable for receiving a succeeding instruction.

5. In an electronic digital computer system for automatically controlling a series of predetermined operations in accordance with a stored program comprising a corresponding series of instructions, a computer programming and control circuit comprising a sequence control unit for sequentially producing sets of sequencing signals, each being indicative of one of a plurality of operating phases including an instruction preparation phase, an instruction recording phase, an instruction reading phase, and an instruction performance phase; static storage register means comprising a plurality of stages each having two stable states for storing a corresponding plurality of binary signals representing an instruction; programming means coupled to said stages and manually operable during said instruction preparation phase for setting said stages to respective stable states representative of a desired instruction; a program unit coupled to said sequence control unit and responsive to a set of sequencing signals for receiving and recording binary signals during said instruction recording phase, and for developing corresponding binary signals during said instruction reading phase; first information transfer means coupled to said static storage register means and to said program unit and operable during said instruction recording phase for transferring a desired instruction from said static storage means into said program unit; and second information transfer means coupled to said program unit and to said static storage register means and operable during said instruction reading phase to apply said binary signals generated by said program unit to said static storage register means for entering an instruction therein, said static storage register means being operable during said instruction performance phase for generating a set of electrical control signals corresponding to an instruction stored therein.

6. In an electronic digital computer system for automatically controlling a series of predetermined operations in accordance with a stored program comprising a corresponding series of instructions, a computer programming and control circuit comprising a sequence control unit for sequentially producing sets of sequencing signals, each being indicative of one of a plurality of operating phases including an instruction preparation phase, an instruction recording phase, an instruction reading phase, and an instruction performance phase, said sequence control unit including means operable upon completion of said instruction reading phase for initiating said instruction performance phase, and upon completion of said instruction performance phase for initiating said instruction reading phase; static storage register means comprising a plurality of stages each having two stable states for storing a corresponding plurality of binary signals representing an instruction; programming means coupled to said stages and manually operable during said instruction preparation phase for setting said stages to respective stable states representative of a desired instruction; a program unit coupled to said sequence control unit and responsive to a set of sequencing signals for receiving and

UNITED STATES PATENT OFFICE
Certificate of Correction

Patent No. 2,866,506                                                    December 30, 1958

Doran C. Hierath et al.

It is hereby certified that error appears in the printed specification of the above numbered patent requiring correction and that the said Letters Patent should read as corrected below.

Column 8, line 66, for "R$t$ and R$t$" read —R$t$ and $\overline{Rt}$—; column 17, lines 12 to 16, Equation (133X) should read as shown below instead of as in the patent—

(133X)
$$Cxr = Rc.(X^c{}_1.X^r{}_1 + \overline{X^c{}_1.X^r{}_1}).(X^c{}_2.X^r{}_2 + \overline{X^c{}_2.X^r{}_2}).$$
$$(X^c{}_4.X^r{}_4 + \overline{X^c{}_4.X^r{}_4}).(X^c{}_8.X^r{}_8 + \overline{X^c{}_8.X^r{}_8}). \ldots$$
$$(X^c{}_{4096}.X^r{}_{4096} + \overline{X^c{}_{4096}.X^r{}_{4096}})$$

column 21, line 31, for "mechanizaiton" read —mechanization—; same line, for "in-" read —indicate—; line 32, strike out "date".

Signed and sealed this 21st day of July 1959.

[SEAL]

Attest:
KARL H. AXLINE,
*Attesting Officer.*

ROBERT C. WATSON,
*Commissioner of Patents.*

UNITED STATES PATENT OFFICE

Certificate of Correction

Patent No. 2,866,506             December 30, 1958

Doran C. Hierath et al.

It is hereby certified that error appears in the printed specification of the above numbered patent requiring correction and that the said Letters Patent should read as corrected below.

Column 8, line 66, for "R$t$ and R$t$" read —R$t$ and $\overline{Rt}$—; column 17, lines 12 to 16, Equation (133X) should read as shown below instead of as in the patent—

(133X)
$$Cxr = Rc.(X^c{}_1.X^r{}_1 + \overline{X^c{}_1}.\overline{X^r{}_1}).(X^c{}_2.X^r{}_2 + \overline{X^c{}_2}.\overline{X^r{}_2}).$$
$$(X^c{}_4.X^r{}_4 + \overline{X^c{}_4}.\overline{X^r{}_4}).(X^c{}_8.X^r{}_8 + \overline{X^c{}_8}.\overline{X^r{}_8}). \ldots ;$$
$$(X^c{}_{4096}.X^r{}_{4096} + \overline{X^c{}_{4096}}.\overline{X^r{}_{4096}})$$

column 21, line 31, for "mechanizaiton" read —mechanization—; same line, for "in-" read —indicate—; line 32, strike out "date".

Signed and sealed this 21st day of July 1959.

[SEAL]

Attest:
KARL H. AXLINE,
*Attesting Officer.*

ROBERT C. WATSON,
*Commissioner of Patents.*